United States Patent
Kadambe

(10) Patent No.: US 7,085,711 B2
(45) Date of Patent: Aug. 1, 2006

(54) METHOD AND APPARATUS FOR BLIND SEPARATION OF AN OVERCOMPLETE SET MIXED SIGNALS

(75) Inventor: Shubha Kadambe, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 714 days.

(21) Appl. No.: 10/007,322

(22) Filed: Nov. 9, 2001

(65) Prior Publication Data

US 2003/0061035 A1    Mar. 27, 2003

Related U.S. Application Data

(60) Provisional application No. 60/246,498, filed on Nov. 9, 2000.

(51) Int. Cl.
*G10L 19/00* (2006.01)
*G10L 21/00* (2006.01)
*H04Q 7/20* (2006.01)

(52) U.S. Cl. .................. 704/201; 704/270; 455/422.1
(58) Field of Classification Search ............... 702/190; 704/200

See application file for complete search history.

(56) References Cited

U.S. PATENT DOCUMENTS

| | | | |
|---|---|---|---|
| 6,182,018 B1 * | 1/2001 | Tran et al. | 702/66 |
| 6,424,960 B1 * | 7/2002 | Lee et al. | 706/20 |
| 6,430,528 B1 * | 8/2002 | Jourjine et al. | 704/200 |

FOREIGN PATENT DOCUMENTS

WO    0011662    3/2000

OTHER PUBLICATIONS

Yang, "Serial updating rule for blind separation derived from the method of scoring", IEEE Transactions on Signal Processing, vol. 47, Issue: 8, Aug. 1999, pp. 2279-2285.*
Sahlin et al., "The asymptotic Cramer-Rao lower bound for blind signal separation", Statistical Signal and Array Processing, 1996. Proceedings., 8th IEEE Signal Processing Workshop on (Cat. No. 96TB10004), Jun. 24-26, 1996, pp. 328-331.*

(Continued)

*Primary Examiner*—W. R. Young
*Assistant Examiner*—Brian Albertalli
(74) *Attorney, Agent, or Firm*—Tope-McKay & Associates

(57) ABSTRACT

A data processing system blind source separation of an overcomplete set of signals generally includes means for storing input from sensors in a mixed signal matrix X 200, noise in a noise matrix V 202, an estimate of the individual signals from the mixture of signals from the signal sources in a source signal estimate matrix $\hat{S}$ 204, and an estimate of environmental effects in a mixing matrix $\hat{A}$ 206, the matrices related by $X = \hat{A}\hat{S} + V$; generating an initial estimate of $\hat{A}$ 208; determining the number of, and associated lines of correlation of, each source from $\hat{A}$, and representing the sources in the source signal estimate matrix $\hat{S}$ 210; jointly optimizing $\hat{S}$ and $\hat{A}$ in an iterative manner to generate an optimized source signal estimate matrix $\hat{S}$ 212 and a final estimated mixing matrix $\hat{A}$; and restoring the separated source signals from the optimized source signal estimate matrix $\hat{S}$ 214.

42 Claims, 18 Drawing Sheets

OTHER PUBLICATIONS

Cardoso, "Separation of non stationary sources; achievable performance", Statistical Signal and Array Processing, 2000. Proceedings of the Tenth IEEE Workshop on , Aug. 14-16, 2000, pp. 359-363.*

Talwar et al., "Blind separation of synchronous co-channel digital signals using an antenna array. II. Performance analysis", IEEE Transactions on Signal Processing, vol. 45, Issue: 3 , Mar. 1997, pp. 706-718.*

Bofill, P., et al., "Blind separation of more sources than mixtures using sparsity of their short-time fourier transforms" Proc. 2nd Int. Workshop on Independent Component Anal. and Blind Sig. Separation, Jun. 19-22, 2000, pp. 87-92, XP008005807.

Gorman, J.D., et al., "On the application of Cramer-Rao type lower bounds for constrained estimation" Speech Proc. 2. VLSI. Underwater Sig. Proc. Toronto, May 14-17, 1991, Int'l Conf. on Acoustics, Speech & Sig. Proc., ICASSP, NY, IEEE, US, vol. 2, Conf. 16, pp. 1333-1336, XP010043285.

Zibulevsky, M., et al., "Blind source separation by sparse decomposition" Wavelet Applications VII, PROC. SPIE, vol. 4056, Jul. 1, 2000, pp. 165-174, XP008005875.

1. M. Zibulevsky and B. A. Pearlmutter, "Blind Source Separation by Sparse Decomposition," University of New Mexico Technical Report No. CS99-1, 1999, no days.

2. L. Q. Zhang, S. Amari and A. Cichocki, "Natural Gradient Approach to Blind Separation of Over and Under Complete Mixtures," Proceedings of ICA '99, Aussois, France 1999, no date.

3. Te-Won Lee, M. S. Lewicki, M. Girolami and S.J. Sejnowski, "Blind Source Separation of More Sources Than Mixtures Using Overcomplete Representations," IEEE Signal Processing Letters, vol. 6, No. 4, pp. 87-90, Apr. 1999, no complet-date.

4. H-C. Wu, J. C. Principe and D. Xu, "Exploring the Time-frequency Microstructure of Speech for Blind Source Separation," ICASSP'98, pp, complete date no found.

5. P.E. Gill, W. Murray and M.H. Wright, Practical Optimization, Chapter 3, Academic Press, 1981, complete date no found.

6. P. Bofill and M. Zibulevsky, "Blind Separation of More Sources than Mixtures Using Sparsity of their Short-time Fourier Transform," Proc. OfICA Workshop, Jul. 1999, pp. 87-92, complete date not found.

7. B.A. Olshausen and D. J. Field, "Sparse Coding with an Overcomplete Basis Set: A Strategy Employed by V 1?" In Vision Research, vol. 37 , pp. 3311-3325, 1997, complete date no found.

* cited by examiner

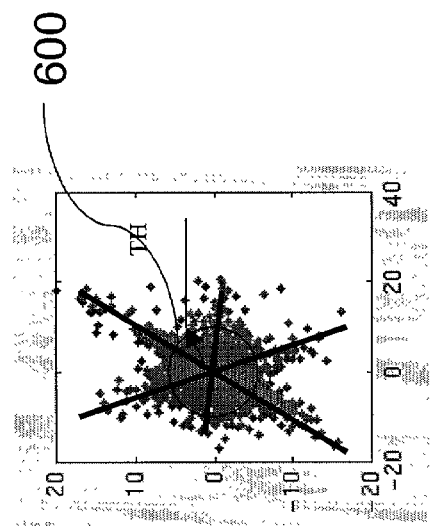
FIG. 6(c)
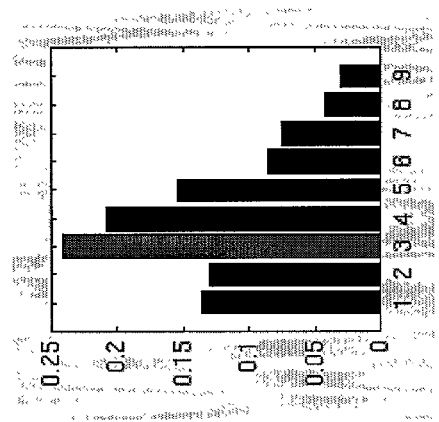
FIG. 6(b)
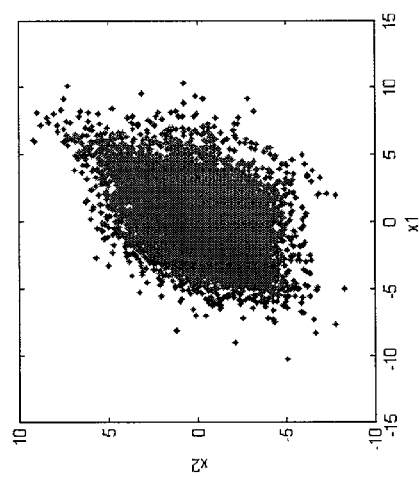
FIG. 6(a)
FIG. 6

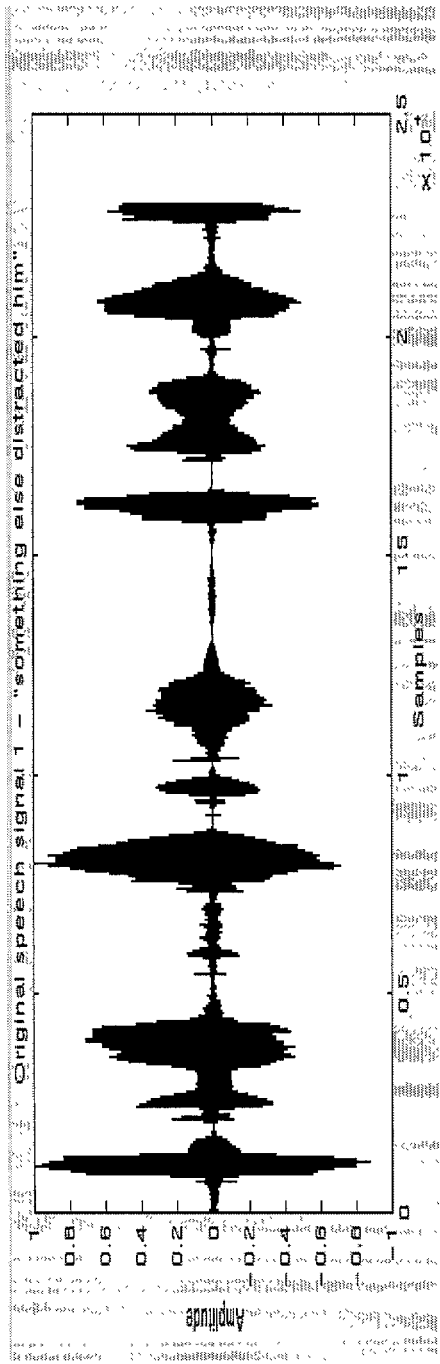
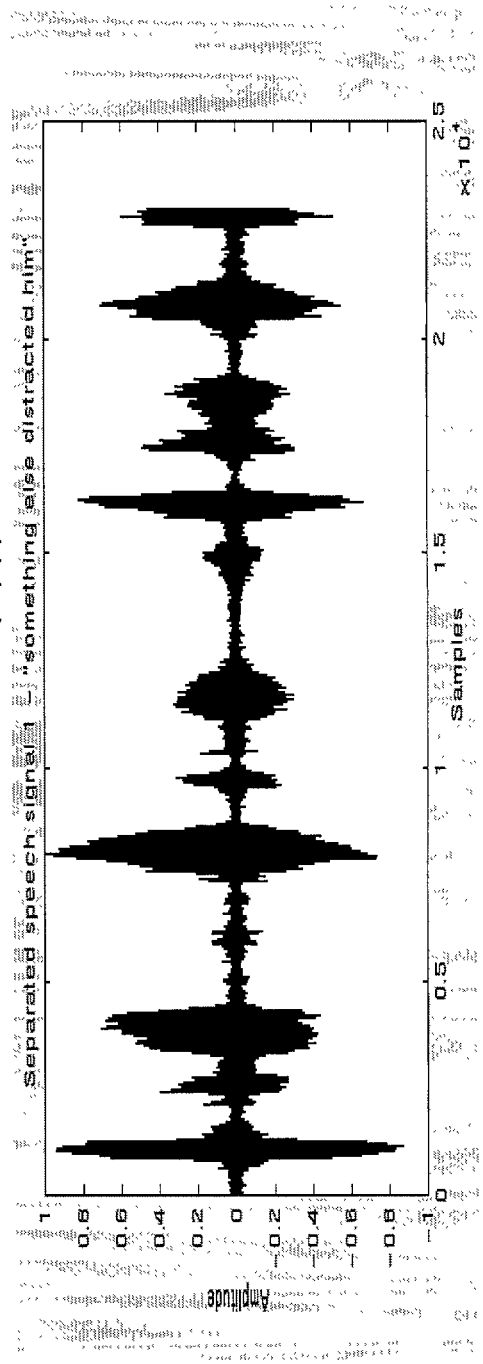
FIG. 10(b)(i)
FIG. 10(b)(ii)
FIG. 10 CONT.

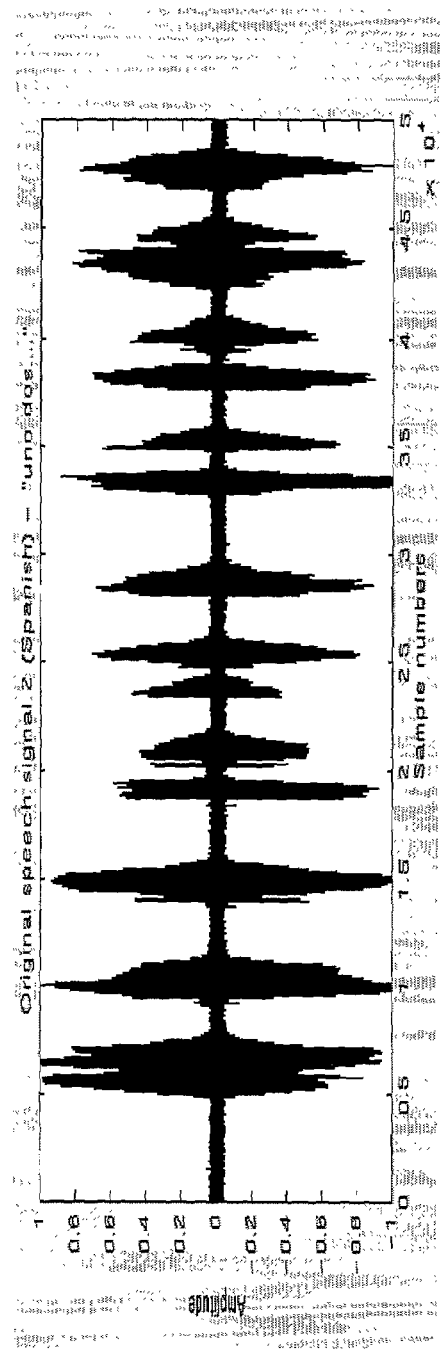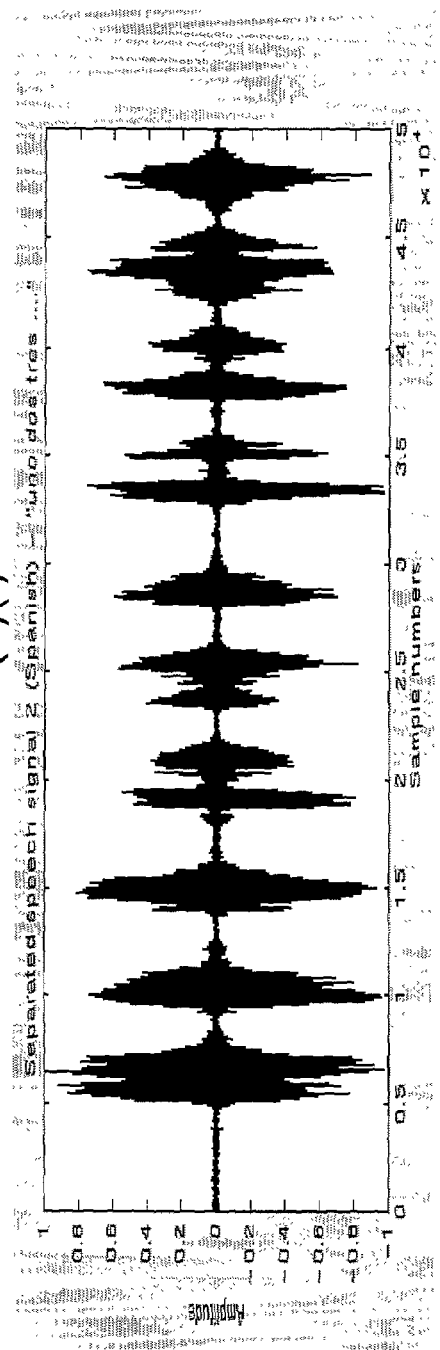
FIG. 11(c)(i)
FIG. 11(c)(ii)
FIG. 11 CONT.

METHOD AND APPARATUS FOR BLIND SEPARATION OF AN OVERCOMPLETE SET MIXED SIGNALS

PRIORITY CLAIM

This application claims the benefit of priority to provisional applications No. 60/246,498, filed in the United States on Nov. 9, 2000, and titled "Over-complete bss by applying sparse decomposition and information theoretic based probabilistic approach".

BACKGROUND

1. Technical Field

The present invention relates to the field of processing signals comprised of a mixture of signals from a plurality of sources, and more particularly to processing signals comprised of a mixture of signals from a plurality of sources in the case where the number of signal sources exceeds that of the number of detecting sensors and where the number of signal sources, the individual signals from the signal sources, and the mixing matrix are unknown.

2. Description of the Art

Blind mixed signal separation is a phrase that describes the separation of signals from a plurality of sources when the number of sources, the individual signals from the signal sources, and the mixing matrix are unknown. When the number of sources exceeds the number of sensors used for receiving a mixed signal from the sources, the case is known as the "over-complete" case. In theory, it is possible to perfectly separate mixed signals if the number of signal sources is equal to or less than the number of sensors. However, the separation of mixed signals in the over-complete case is difficult and perfect separation is not possible, even theoretically.

The separation of mixed signals is an issue in many situations, two important examples of which include cellular communications, especially in urban environments, and in spoken dialogue information retrieval on mobile platforms. In cellular communications, the interference signals correspond to the signals that get reflected from various scatterers (multipath) such as buildings and noise. On the other hand, in spoken dialogue-based systems on mobile platforms, the interference signals correspond to other speakers and noise. The signal that is received at a sensor is a mixed signal that includes interference signals as well as the desired signals, together discussed herein as source signals. In these cases, it is not practical to know a priori the number of interfering signals (which are considered as different signal sources), and hence, it is not practical to use the same number of sensors, e.g., antennas in the case of cellular communication and microphones in the case of spoken dialogue-based systems, as that of the signal sources. It is therefore imperative to develop a signal separation system that can handle the over-complete case for efficient and clear cellular communication and for robust spoken dialogue-based information retrieval on mobile platforms. This is important to provide clear communication in the case of cellular phones and to improve speech recognition in the case of spoken dialogue-based information retrieval systems.

As stated, since the number and nature of source signals change, it is not practical to know them a priori. Therefore, it is not always practical to apply signal separation techniques that work well when the number of source signals is equal to the number of sensors. Further, in this case, since how the signals get mixed (e.g., the mixing matrix) is unknown, it is necessary to apply blind techniques for the separation of the source signals.

The solution of the over-complete case is a relatively recent topic within the research community. A few techniques have been developed, as discussed in the references provided at the end of this Background section. These techniques generally suffer from several drawbacks. They suffer from limited signal separation efficiency. Further, they lack robustness for different types of mixing matrices and signals. Additionally, they are computationally sluggish, making real-time implementation difficult. Finally, their theoretical limitations are difficult to ascertain, making them difficult to apply due to uncertainty regarding their performance.

More specifically, in M. Zibulevsky and B. A. Pearlmutter, "Blind source separation by sparse decomposition," University of New Mexico technical report No. CS99-1, 1999, the estimation of the mixing matrix and source signals takes place separately, which does not allow for efficient separation of the mixed signals, since the estimation of the mixing matrix effects the estimation of the source signals, resulting in complex and expensive computation. In L. Q. Zhang, S. Amari and A. Cichocki, "Natural gradient approach to blind separation of over and under complete mixtures," Proceedings of ICA'99, Aussois, France 1999, a natural gradient approach to blind source separation of over and under-complete mixtures is described from a theoretical point of view. The method described makes use of Lie group structures in the source signals and uses Reimann metrics. A learning algorithm based on the minimization of mutual information is described. In Te-Won Lee, M. S. Lewicki, M. Girolami and S. J. Sejnowski, "Blind source separation of more sources than mixtures using overcomplete representations," IEEE Signal processing letters, Vol. 6, No. 4, pp. 87–90, April 1999, another probabilistic approach is described. This technique estimates the mixing matrix and the source signals separately, hence having the same disadvantage as Zibulevsky et al., mentioned above. The mixing matrix is estimated by considering it as basis vectors and an approximated learning rule is applied. In this approximation, it is assumed there is no additive noise and that there exists temporal independence of the samples of the mixtures. The technique in Lee et al., is demonstrated only for use with clean mixed signals and a fixed mixing matrix. In H-C. Wu, J. C. Principe and D. Xu, "Exploring the time-frequency microstructure of speech for blind source separation,", ICASSP'98, pp. 1145–1148, an approach based on the concept of thinning and estimating the spatial directions of the mixing matrix is applied for blind source separation. This approach is not probabilistic-based, which limits its ability to separate source signals. Furthermore, the approach appears to be effective only when the number of sensors is equal to the number of sources. In P. Bofill and M. Zibulevsky, "Blind separation of more sources than mixtures using sparsity of their short-time fourier transform," Proc. Of ICA workshop, July 1999, pp. 87–92, a probabilistic approach is described in which the mixing matrix and the source signals are estimated separately, thus suffering from the same disadvantage as Zibulevsky et al., mentioned above. Finally, all of these references suffer from the drawback of an unknown theoretical performance bound. Thus, a user operating a system based on one of these techniques cannot know the theoretical limitations of their system.

It is desirable to provide a system for solving the over-complete case that overcomes these limitations and that estimates the mixing matrix jointly to provide an advantage of efficiently separating the mixed signals by taking into account the effect of estimating the mixing matrix on the estimate of the source signals, and which allows for efficient convergence on a solution.

The following references are provided to assist the reader in gaining more knowledge regarding the state of the art in this technical area.

REFERENCES

1. M. Zibulevsky and B. A. Pearlmutter, "Blind source separation by sparse decomposition," University of New Mexico technical report No. CS99-1, 1999.
2. L. Q. Zhang, S. Amari and A. Cichocki, "Natural gradient approach to blind separation of over and under complete mixtures," Proceedings of ICA'99, Aussois, France 1999.
3. Te-Won Lee, M. S. Lewicki, M. Girolami and S. J. Sejnowski, "Blind source separation of more sources than mixtures using overcomplete representations," IEEE Signal processing letters, Vol. 6, No. 4, pp. 87–90, April 1999.
4. H-C. Wu, J. C. Principe and D. Xu, "Exploring the time-frequency microstructure of speech for blind source separation,", ICASSP'98, pp. 1145–1148.
5. P. E. Gill, W. Murray and M. H. Wright, *Practical optimization*, Chapter 3, Academic Press, 1981.
6. P. Bofill and M. Zibulevsky, "Blind separation of more sources than mixtures using sparsity of their short-time fourier transform," Proc. Of ICA workshop, July 1999, pp. 87–92.
7. B. A. Olshausen and D. J. Field, "Sparse coding with an overcomplete basis set: A strategy employed by V1?," In Vision Research, vol. 37, pp. 3311–3325, 1997.

SUMMARY

The present invention provides an apparatus, a method, and a computer program product for separating mixed signals into estimates of their source signal components. Specifically, the apparatus is designed to allow for the efficient separation of an overcomplete set of mixed signals.

In one embodiment, the apparatus comprises a data processing system including an input for receiving mixed signals from a plurality of sensors, where the sensors are configured to receive mixed signal samples. The mixed signal samples comprise a mixture of signals transmitted from signal sources through an environment and noise. A signal processor is attached with the input for receiving the mixed signals from the sensors. A memory is attached with the signal processor for storing data during operations of the signal processor. The data processing system further comprises means for storing data representing the input from the sensors in a mixed signal matrix X; means for storing data representing the noise in a noise matrix V; means for storing data representing an estimate of the individual signals from the mixture of signals from the signal sources in a source signal estimate matrix ; means for storing data representing an estimate of the effects of the environment in a estimated mixing matrix where the matrices are related by; means for generating an initial estimate of the estimated mixing matrix; means for determining the number of signal sources and associated lines of correlation of each of the signal sources from the estimated mixing matrix , and for representing the signal sources in the source signal estimate matrix ; means for jointly optimizing the source signal estimate matrix and the estimated mixing matrix in an iterative manner, to generate an optimized source signal estimate matrix and a final estimated mixing matrix; and means for restoring the separated source signals from the optimized source signal estimate matrix , whereby a plurality of mixed signals from unknown sources traveling through an environment with added noise may be separated so that the original, separate signals may be reconstructed.

In a further embodiment, the means for generating an initial estimate of the estimated mixing matrix $\hat{A}$ comprises means for transforming the mixed signal matrix X into the sparse domain using a transform operator; means for determining a frequency band within the sparse domain that contains the most information that can be used to determine lines of correlation to determine the number of signal sources; means for determining a measure and an optimal threshold for the measure for the determination of noise within the frequency band; means for recalculating the measure used in the determination of the noise within the frequency band using the optimal threshold; and means for determining the local maxima of a distribution of the measure, where the local maxima represent angles which are inserted into the estimated mixing matrix $\hat{A}$ to provide an initial estimate of the estimated mixing matrix $\hat{A}$.

In a still further embodiment, the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ comprises means for clustering the mixed signal samples using a geometric constraint; and means for evaluating a convergence criteria based on the clustered mixed signal samples to determine whether the convergence criteria are met, and if the convergence criteria are not met, iteratively adjusting the clustering of the mixed signal samples and parameters of the geometric constraint to create a new set of clusters until the convergence criteria are met, to provide a final estimated mixing matrix $\hat{A}$.

In a still further embodiment, the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ further comprises means for obtaining a multi-band sparse domain estimate of the source signal estimate matrix $\hat{S}$ using the relationship $X=\hat{A}\hat{S}+V$; and means for using the adjusted geometric constraint corresponding to the final estimated mixing matrix $\hat{A}$ in each of the bands of the sparse domain for the source signal estimate matrix $\hat{S}$ and determining whether a convergence criteria is met for the source signal estimate matrix $\hat{S}$, and if the convergence criteria are not met, iteratively adjusting the clustering of the mixed signal samples to create a new set of clusters until the convergence criteria are met, to provide a final source signal estimate matrix $\hat{S}$.

In accordance with the present invention, it is preferable that the means for transforming the mixed signal matrix X into the sparse domain using a transform operator is a Fourier transform operator such that the estimated mixing matrix $\hat{A}$ is represented in the Fourier transform, and wherein the means for obtaining a multi-band sparse domain estimate of the source signal estimate matrix $\hat{S}$ using the relationship $X=\hat{A}\hat{S}+V$ uses a wavelet transform operator to obtain the multi-band sparse domain estimate.

It is also preferable that the means for generating an initial estimate of the estimated mixing matrix $\hat{A}$ comprises means for transforming the mixed signal matrix X into the frequency domain using a Fourier operator; means for using a mutual information criterion to determine a frequency band within the sparse domain that contains the most information that can be used to determine lines of correlation to determine the number of signal sources; means for determining a random variable $$ang = \arctan\frac{x_i(\text{band})}{x_j(\text{band})},$$

where $x_i(\text{band})$ and $x_j(\text{band})$ represent Fourier values of mixture in the selected frequency band, and an optimal threshold ANG for ang, where the optimal threshold ANG is determined by computing the entropy E(ang, ANG) vs. ANG and searching for the optimal value of ANG corresponding to the minimum rate of descent of the entropy E(ang, ANG); means for recalculating ang based on the optimal threshold ANG; means for using a standard peak detection technique to determine the number and values of local maxima of a histogram of ang where the local maxima represent angles which are inserted into the estimated mixing matrix $\hat{A}$ to provide an initial estimate of the estimated mixing matrix $\hat{A}$.

It is also preferable that the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ comprises means for clustering the mixed signal samples in the Fourier domain along the lines of correlation with one cluster per source using a straight distance metric geometric constraint, with the clusters representing estimates of the Fourier domain representation of $\hat{S}$, $F(\hat{S})$, where F represents a Fourier domain operator; and means for evaluating a convergence criteria, min $\lambda c^T|F(\hat{S})|$, with the convergence criteria, min $\lambda c^T|F(\hat{S})|$, developed from the log likelihood function $L(F(\hat{S})|F(X),A)$ with the assumption of Laplanicity of source signals in the Fourier domain following the probability $$P(F(S)) = \frac{\lambda}{2}e^{-\lambda c^T|F(\hat{S})|},$$

where $c^T=[1, 1, \ldots 1]$ is a unit vector, with the convergence criteria, min $\lambda c^T|F(\hat{S})|$, evaluated based on the clustered mixed signal samples to determine whether the convergence criteria, min $\lambda c^T|F(\hat{S})|$, is met, and if the convergence criteria, min $\lambda c^T|F(\hat{S})|$, is not met, iteratively adjusting the clustering of the mixed signal samples and parameters of the geometric constraint to create a new set of clusters until the convergence criteria, min $\lambda c^T|F(\hat{S})|$, is met, to provide a final estimated mixing matrix $\hat{A}$.

It is additionally preferable that the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ further comprises means for obtaining a multi-band sparse domain estimate of the source signal estimate matrix $\hat{S}$ using the relationship $X=\hat{A}\hat{S}+V$, applied in the Wavelet domain; and means for using the adjusted geometric constraint corresponding to the final estimated mixing matrix $\hat{A}$ in each of the bands of the Wavelet domain for the source signal estimate matrix $\hat{S}$, $W(\hat{S})$, and determining whether a convergence criteria, min $\lambda c^T|W(\hat{S})|$ is met for the source signal estimate matrix $\hat{S}$, where the convergence criteria, min $\lambda c^T|W(\hat{S})|$, is developed from the log likelihood function $L(W(\hat{S})|W(X),A)$ with the assumption of Laplanicity of source signals in the Wavelet domain following the probability $$P(W(S)) = \frac{\lambda}{2}e^{-\lambda c^T|W(\hat{S})|},$$

where $c^T=[1, 1, \ldots 1]$ is a unit vector, and if the convergence criteria is not met, min $\lambda c^T|W(\hat{S})|$, iteratively adjusting the clustering of the mixed signal samples to create a new set of clusters until the convergence criteria, min $\lambda c^T|W(\hat{S})|$, is met, to provide a final source signal estimate matrix $\hat{S}$.

Two major applications of the present invention are separating acoustic signals for applications such as voice recognition and separating mixed radio frequency signals for applications such as separating cellular phone signals.

The present invention may also be embodied as a method, in which the "means" discussed above are interpreted as steps operated on a data processing system as previously described.

Additionally, the present invention may be embodied as a computer program product, in which the "means" discussed above are recorded on a computer readable medium such as an optical storage device (e.g., a CD or DVD).

The "means" of the present invention are generally in the form of program logic that may be in the form of computer program code or may be embedded in hardware depending on the needs of a particular embodiment.

BRIEF DESCRIPTION OF THE DRAWINGS

These and other features, aspects, and advantages of the present invention will become better understood with regard to the following description, appended claims, and accompanying drawings where:

FIG. 6(a) is an example scatter plot of original mixed data;

FIG. 6(b) is a bar graph depicting mutual information in each of several frequency sub-bands;

FIG. 6(c) is a scatter plot of spectral values of a chosen sub-band;

FIG. 6(d) is an angle histogram of the chosen sub-band;

FIG. 6(e) is a rate of change of entropy plot depicting threshold selection at a point of minimum rate of change of entropy;

FIG. 6(f) is an angle histogram of the chosen sub-band after thresholding;

FIG. 10(*a*) depicts the original mixed signal including the three English speech signals mixed with the two noise signals;

FIG. 10(*b*)(*i*) depicts a first original (unmixed) English speech signal;

FIG. 10(*b*)(*ii*) depicts the first English speech signal after separation, for comparison with the original depicted in FIG. 10(*b*)(*i*);

FIG. 10(*c*)(*i*) depicts a second original (unmixed) English speech signal;

FIG. 10(*c*)(*ii*) depicts the second English speech signal after separation, for comparison with the original depicted in FIG. 10(*c*)(*i*);

FIG. 10(*d*)(*i*) depicts a third original (unmixed) English speech signal;

FIG. 10(*d*)(*ii*) depicts the third English speech signal after separation, for comparison with the original depicted in FIG. 10(*d*)(*i*);

FIG. 11(*a*) depicts the original two mixed signals including the three mixed language speech signals mixed with the two noise signals;

FIG. 11(*b*)(*i*) depicts a first original (unmixed) mixed language speech signal;

FIG. 11(*b*)(*ii*) depicts the first mixed language speech signal after separation, for comparison with the original depicted in FIG. 11(*b*)(*i*);

FIG. 11(*c*)(*i*) depicts a second original (unmixed) mixed language speech signal;

FIG. 11(*c*)(*ii*) depicts the second mixed language speech signal after separation, for comparison with the original depicted in FIG. 11(*c*)(*i*);

FIG. 11(*d*)(*i*) depicts a third original (unmixed) mixed language speech signal; and FIG. 11(*d*)(*ii*) depicts the third mixed language speech signal after separation, for comparison with the original depicted in FIG. 11(*d*)(*i*).

DETAILED DESCRIPTION

The present invention relates to the field of processing signals comprised of a mixture of signals from a plurality of sources, and more particularly to processing signals comprised of a mixture of signals from a plurality of sources in the case where the number of signal sources exceeds that of the number of detecting sensors and where the number of signal sources, the individual signals from the signal sources, and the mixing matrix are unknown. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of terms used in the description and claims is given as a central resource for the reader. Then, a brief introduction is provided in the form of a narrative description of the present invention to give a conceptual understanding prior to developing the specific details.

(1) Glossary

Before describing the specific details of the present invention, it is useful to provide a centralized location in which various terms used herein and in the claims. The terms defined are as follows:

Environment—The term "environment" refers generally to the physical environment across which signals are transmitted and mixed prior to sampling by the sensors. An environment typically creates problems with clear transmission such as multipath, distortion, and attenuation.

Means—The term "means" as used in this invention generally indicates a set of operations to be performed on a computer. Non-limiting examples of "means" include computer program code (source or object code) and "hard-coded" electronics. The "means" may be stored in the memory of a computer or on a computer readable medium.

Noise—The term "noise" generally includes any unwanted signals received at the sensors. For example, background music or murmur in the case of separating speech signals.

Sensor—The term "sensor" refers to a mechanism for sampling data from the environment for delivery to a processor. The present invention is intended to be compatible with a wide range of sensors, two important broad classes of which include audio sensors (microphones) and radio-frequency sensors (antennae).

(2) Introduction

Figure 1:
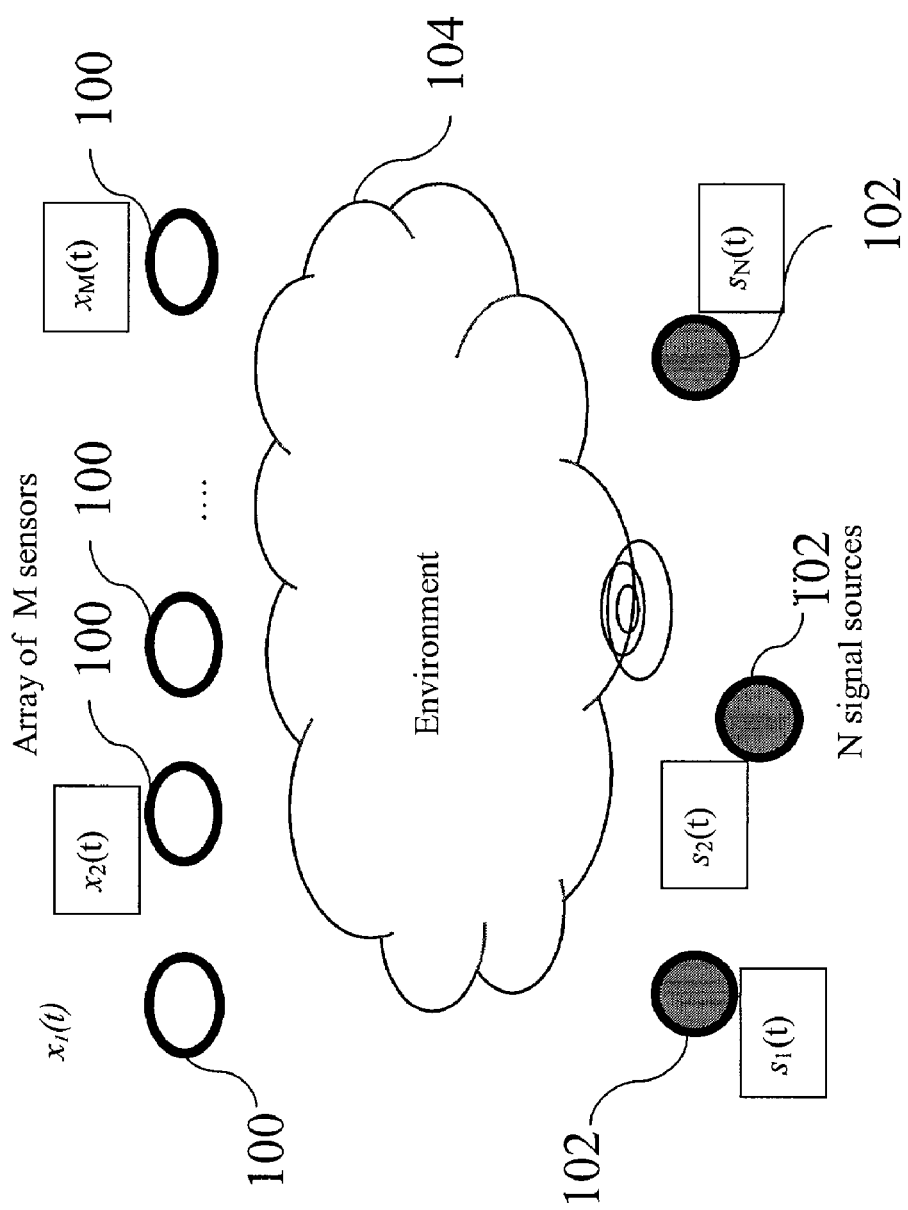
FIG. 1 is an illustrative diagram depicting an array of sensors, an environment, and a plurality of signal sources in order to depict the general operating environment of the present invention.

The present invention is developed to solve the problem depicted in FIG. 1, wherein an illustrative diagram is presented, depicting an array of sensors $x_M(t)$ 100 and a plurality of signal sources $s_N(t)$ 102, where M and N represent the number of sensors $x_M(t)$ 100 and signal sources $s_N(t)$ 102, respectively, and where t represents time. The array of sensors $x_M(t)$ 100 is configured to sample the signals from the signal sources $s_N(t)$ 102, where the signals are mixed and include noise and the effects of the environment 104. The signals may be combined instantaneously or convolutively, or both. How the signals are combined depends on an a priori unknown environment through which the signals transmit.

It is provided that X is an M×T matrix corresponding to the output of M sensors at times t=1, 2 ..., T. In other words, the row I of X corresponds to the $I^{th}$ mixture signal $x_i$. It is further provided that S is an N×T matrix of underlying source signals and that A is an unknown M×N mixing matrix corresponding to the environment effect in mixing the signals that is observed at M sensors. Additionally, it is provided that V is an M×T noise matrix representing other noise from the environment. The observed signal X can then be represented mathematically in the matrix form as X=AS+V. The problem of blind source separation (BSS) is to recover the original source signals S from the observations of X (e.g., the samples of the signal at each sensor $x_M(t)$ 100) without the prior knowledge of source signals and the mixing matrix A. The blind source separation techniques that handle the cases (a) M=N, (b) N<M and (c) N>M are referred as regular, under and over-complete blind source separation, respectively. A principal focus of the present invention is the over-complete blind source separation problem since it is encountered in many practical applications. Although the present invention is equally applicable to regular and under-complete blind source separation, the discussion herein is focused on the over-complete blind source separation case. In the regular and under-complete cases, it is theoretically possible to separate the source signals from the mixed observed signals perfectly; however, it is not possible to separate signals perfectly in the over-complete case even theoretically. Due to additive noise and rectangular nature of the mixing matrix A, the solution of separating source signals from the mixed signals cannot be solved by finding the pseudo-inverse $S=A^+X$. A more efficient technique is a probabilistic approach, which is the approach used by this invention.

The separation of signals blindly using probabilistic approaches mainly corresponds to minimizing the log of a posterior likelihood function P(S|X,A) with respect to S. This likelihood function (conditional probability function) can be written in the form $$P(S|X,A) \propto P(X|A,S)P(A,S) = P(X|A,S)P(A)P(S)$$

by applying the Baye's theorem and assuming statistical independence between A and S. Here, P(A) and P(S) correspond to prior probabilities of A and S, respectively. The result of applying the log operation to P(S|X,A) is L(S|X,A)=L(X|A,S)+L(A)+L(S) where L corresponds to log(P( )). The minimization of log likelihood function of P(S|X,A) then corresponds to minimizing L(X|A,S)+L(S) with respect to S since there is no prior information on A. Since the separation of S depends on A, by jointly optimizing the above log likelihood function with respect to both A and S the source signals may be separated from the observations more efficiently.

Figure 2:
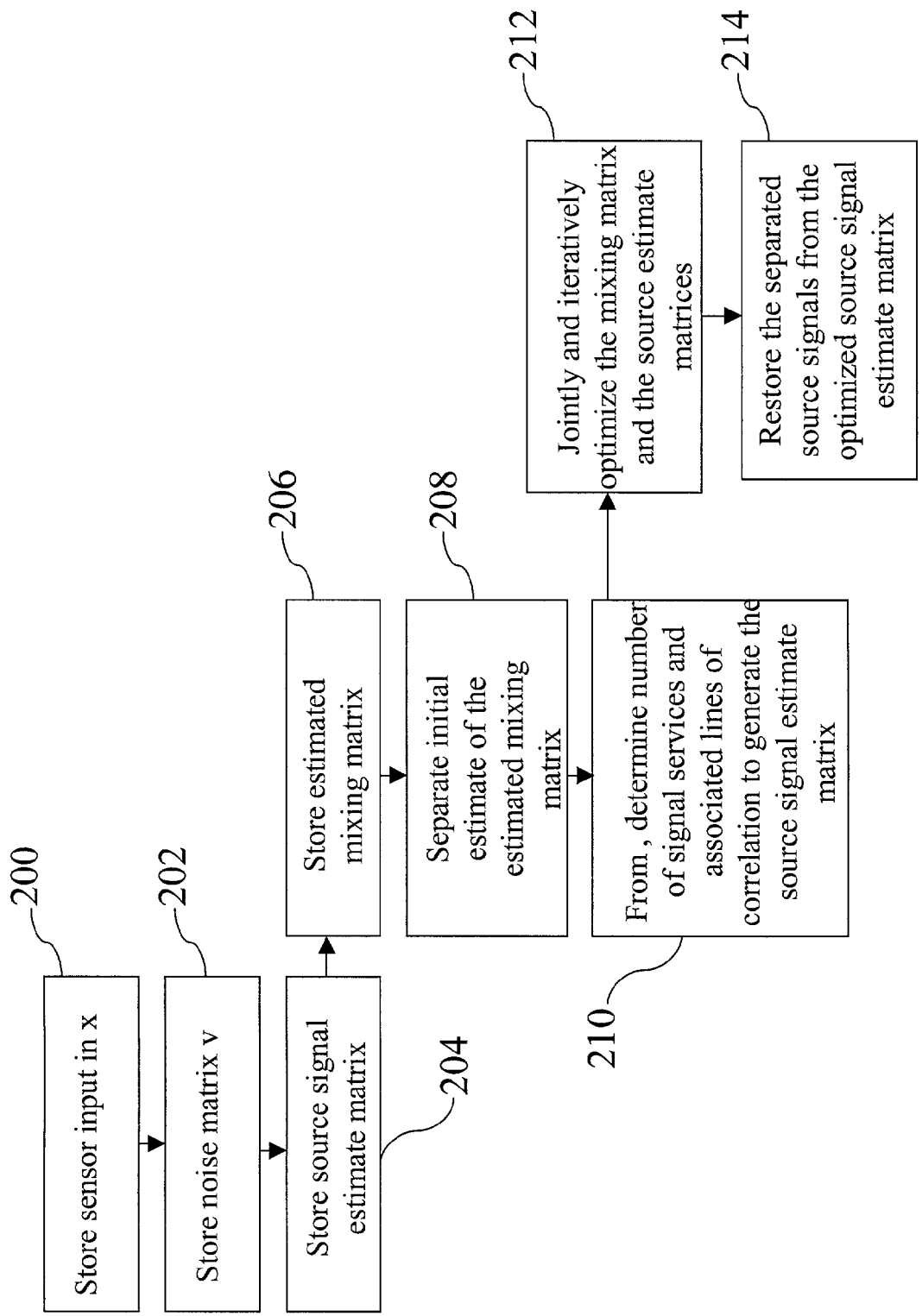
FIG. 2 is a flow diagram depicting the general operation of the present invention.

A flow diagram depicting the general operation of the present invention is shown in FIG. 2. The present invention generally comprises several operations, which are typically performed as software operating on a data processing system. Although discussed in the form of "means plus function" so as to encompass software and hardware versions as well as a variety of mathematical and coding techniques, this discussion of "means" applies equally to steps in the method of the present invention.

First, in order to separate the source signals from a mixed signal, the invention incorporates, within the data processing system, a means for storing data representing the input from the sensors in a mixed signal matrix X 200. The actual sensor input may be stored in the mixed signal matrix X 200. A noise matrix V is also allocated by a means for storing data representing the noise in a noise matrix V 202. The invention further incorporates a means for storing an estimate of the individual signals from the mixture of signals from the signal sources in a source signal estimate matrix $\hat{S}$ 204. In addition, the invention also incorporates a means for storing data representing an estimate of the effects of the environment in an estimated mixing matrix $\hat{A}$ 206. The matrices are related by $X=\hat{A}\hat{S}+V$. The means 200, 202, 204, and 206 may be operated in any sequence, or may be operated in parallel—their ordering in FIG. 2 was selected arbitrarily. The means 200, 202, 204, and 206 are typically in the form of a data structure within memory.

After allocation of the storage area for, and the population of, the mixed signal matrix X with signal (data) samples, a means for generating an initial estimate of the estimated mixing matrix $\hat{A}$ 208 is operated. Subsequently, with the results, a means for determining the number of signal sources and associated lines of correlation of each of the signal sources from the estimated mixing matrix $\hat{A}$, and for representing the signal sources in the source signal estimate matrix $\hat{S}$ 210 is operated in order to prepare for the joint optimization procedure. Next, a means for jointly optimizing the source signal estimate matrix $\hat{S}$ and the estimated mixing matrix $\hat{A}$ in an iterative manner 212 is operated in order to generate an optimized source signal estimate matrix $\hat{S}$ and a final estimated mixing matrix $\hat{A}$. Once the optimized source signal estimate matrix $\hat{S}$ and the final estimated mixing matrix $\hat{A}$ have been obtained, the signals are restored by a means for restoring the separated source signals from the optimized source signal estimate matrix $\hat{S}$ 214. As a result, a plurality of mixed signals from unknown sources traveling through an environment with added noise may be separated so that the original, separate signals may be reconstructed.

Details of the various physical embodiments of the present invention are discussed below. Then, the means for generating an initial estimated mixing matrix $\hat{A}$ 208 and for jointly optimizing the initial estimated mixing matrix $\hat{A}$ and a source signal estimate matrix $\hat{S}$ 212, and for restoring the signals 214 are presented in more detail. Finally, an apparatus and technique are presented for determining a theoretical Crame-Rao (CR) bound for the initial estimated mixing matrix $\hat{A}$ and a source signal estimate matrix $\hat{S}$ is provided to allow for an understanding of the operational limits of an embodiment of the present invention.

(3) Physical Embodiments of the Present Invention

The present invention has three principal physical embodiments. The first is an apparatus for blind signal separation in the form of a data processing system, typically operating software to separate signals received from a plurality of sensors from a plurality of sources. The second physical embodiment is a method, typically software, operated on a data processing system. The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks and flash-type memories. These embodiments will be described in more detail below.

Figure 3:
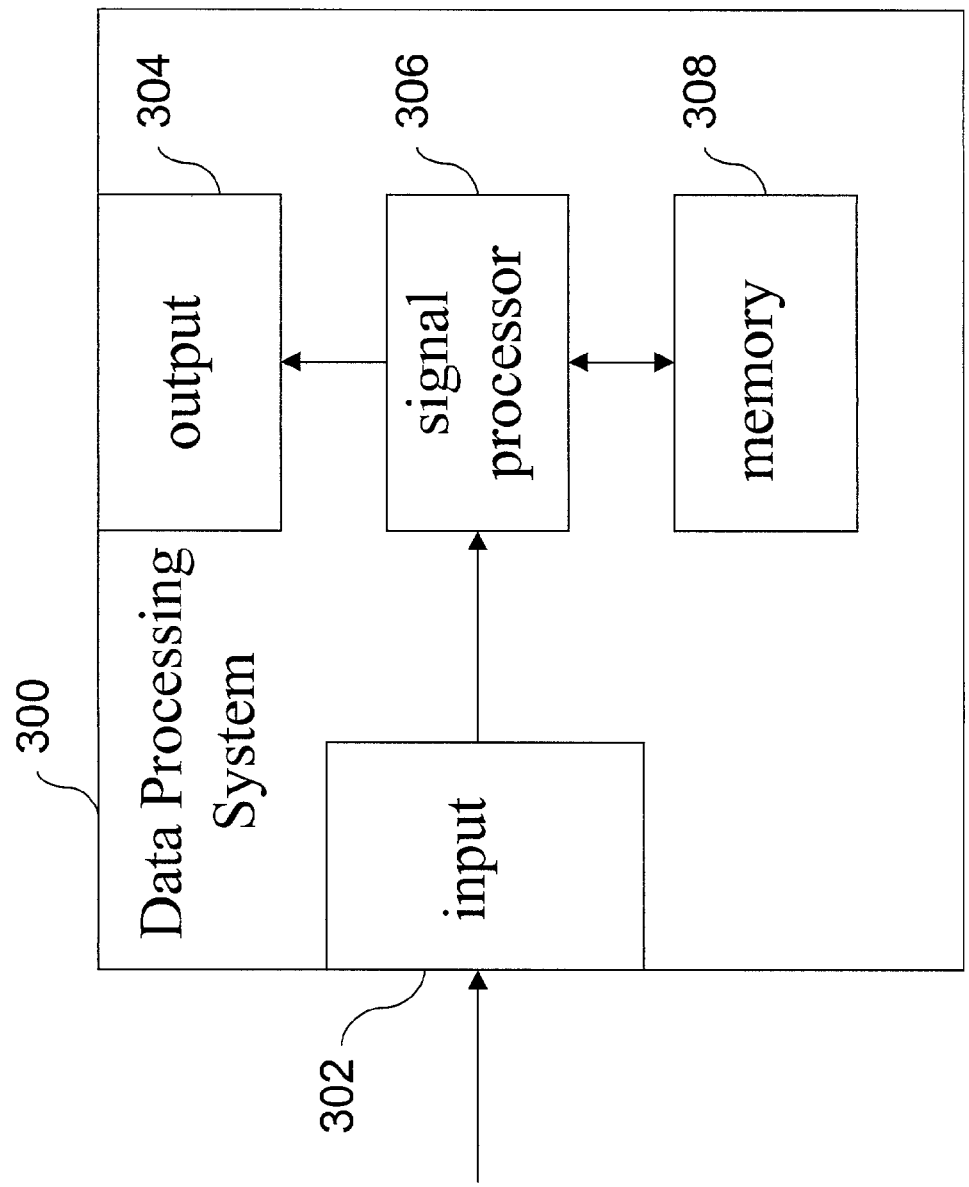
FIG. 3 is a block diagram depicting the components of a processing system used in the present invention.

A flow diagram depicting the components of a processing system used in the present invention is provided in FIG. 3. The data processing system 300 comprises an input 302 for receiving data from a plurality of sensors and an output 304 for providing output to a user. The output provided to the user is typically in the form of estimated separated source signals, or intermediate steps along the way toward generating the estimated separated source signals. On the other hand, the output could also comprise the theoretical bound for a blind source separation system. The input 302 and the output 304 are both coupled with a signal processor 306, which may be a general-purpose computer processor or a specialized processor designed specifically for use with the present invention. The signal processor 306 is coupled with a memory 308 to permit storage of data and software to be manipulated by commands to the processor.

Figure 4:
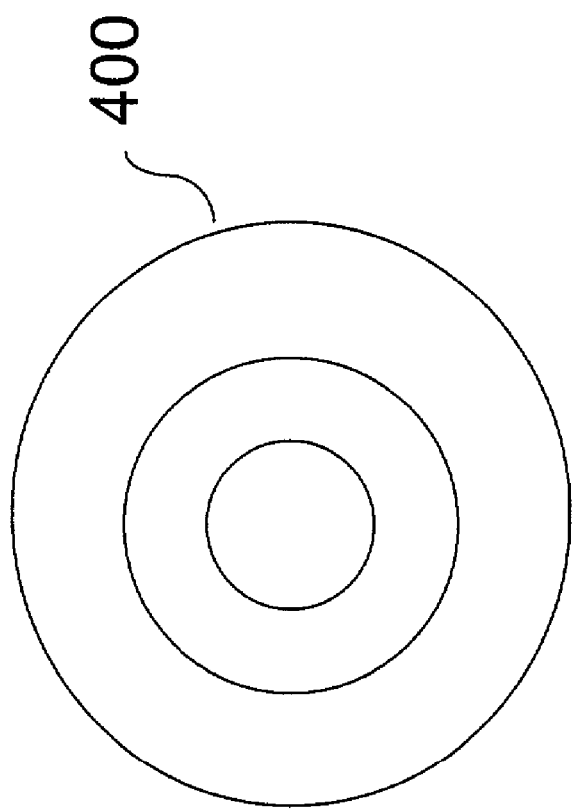
FIG. 4 is an illustrative diagram of a computer program product embodiment of the present invention.

An illustrative diagram of a computer program product embodying the present invention is depicted in FIG. 4. The computer program product 400 is depicted as an optical disk such as a CD or DVD. However, as mentioned previously, the computer program product generally represents computer readable code stored on any compatible computer readable media.

(4) Generating the Initial Estimated Mixing Matrix Â

Before describing the joint optimization apparatus and technique, a description of the generation of the initial estimated mixing matrix Â is provided. This description also serves to help clarify the concepts behind the joint optimization.

When mixed signals are sparse, the distribution of data in the mixture space forms a set of elongated clusters along the directions of the columns of the mixing matrix A. Therefore, a goal in obtaining an initial estimate of the mixing matrix A is to determine lines or directions (angles) of maximum data density. Sparsity refers to only a small number of coefficients in the mixing matrix A in the transformed domain differing significantly from zero.

This description of the technique for generating an initial estimate of the mixing matrix A is set in the context of an example with three independent speech sources, two sensors, and two noise sources. The observed mixed signal matrix X is a 2×T matrix, where each row of X represents one of the observed signals (from the point of view of the sensors), $x_1$ and $x_2$. The mixing matrix A, in this case, is a 2×3 matrix. The source signal matrix S is a 3×T matrix, with each row representing one of the three signal sources. The noise matrix V is a 2×T matrix, with each row representing one of the two noise sources.

Figure 5:
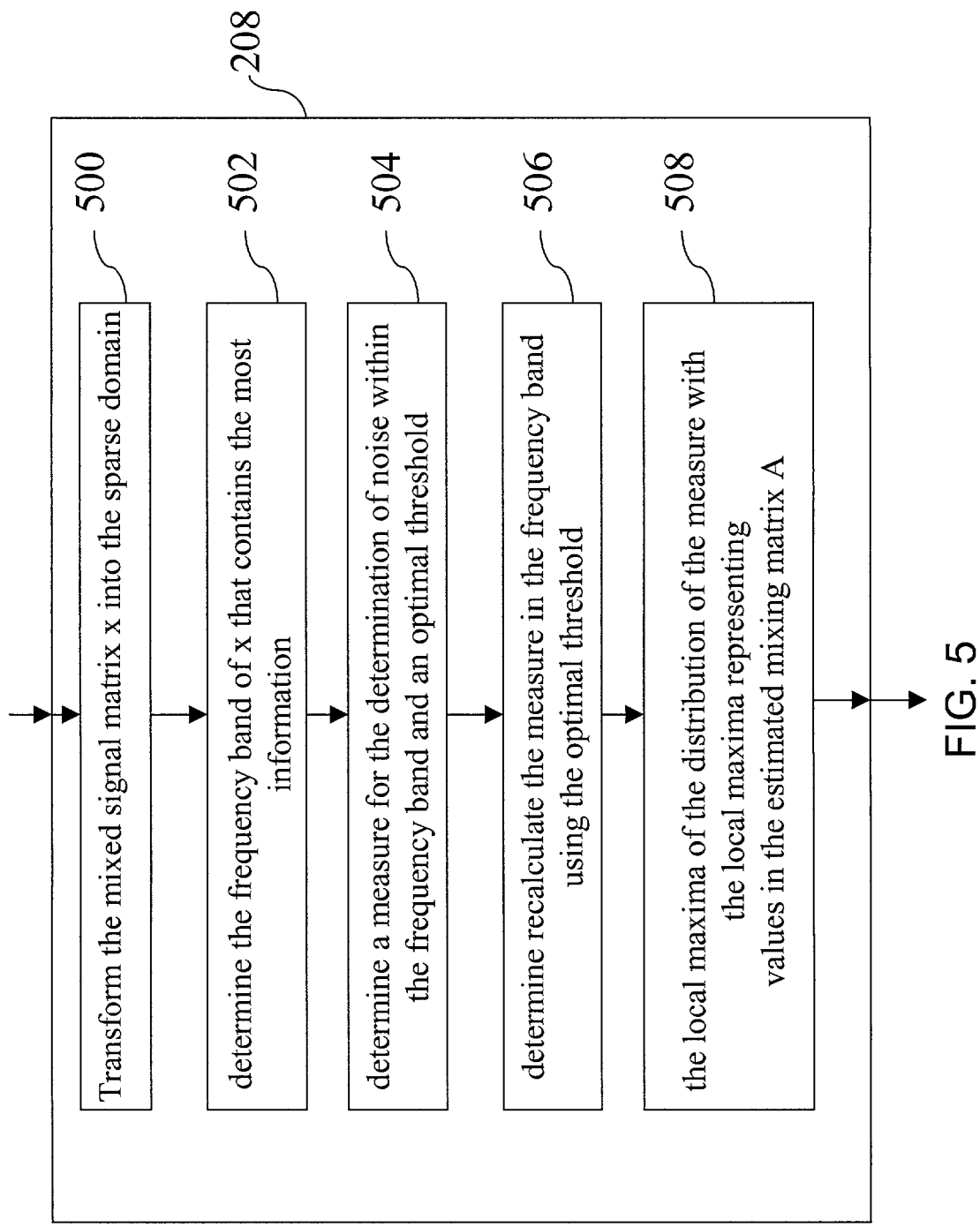
FIG. 5 is a more specific flow diagram depicting the operation of the present invention, illustrating a preferred embodiment for generating the initial estimate of the estimated mixing matrix $\hat{A}$.
Figure 6:
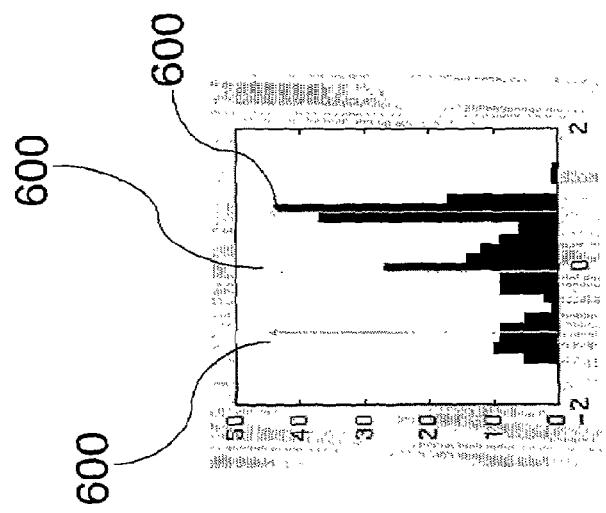
FIG. 6 is a composite diagram depicting the results of operations corresponding to the flow diagrams, where.
Figure 6:
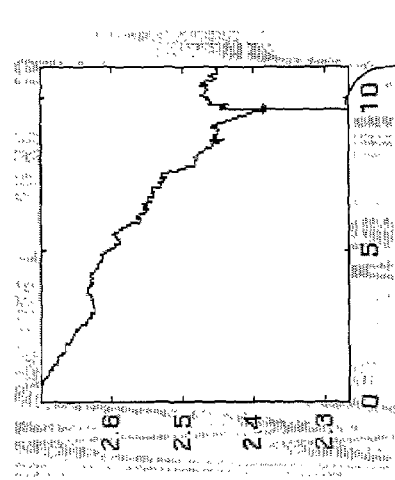
Figure 6:
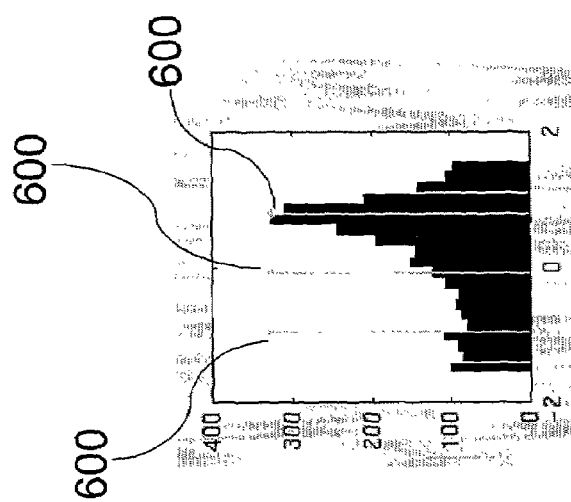

A more specific flow diagram depicting the operation of the present invention, illustrating a preferred embodiment for generating the initial estimate of the estimated mixing matrix Â, is depicted in FIG. 5. To aid in the understanding of the steps involved in generating the initial estimate of the estimated mixing matrix Â, a composite diagram depicting the results of operations corresponding to the flow diagrams, is presented in FIG. 6. More specifically, an example scatter plot of original mixed data is presented in FIG. 6(*a*); a bar graph depicting mutual information in each of several frequency sub-bands is presented in FIG. 6(*b*); a scatter plot of spectral values of a chosen sub-band is presented in FIG. 6(*c*); an angle histogram of the chosen sub-band is depicted in FIG. 6(*d*); an rate of change of entropy plot depicting threshold selection at a point of minimum rate of change of entropy is depicted in FIG. 6(*e*); and an angle histogram of the chosen sub-band after thresholding is depicted in FIG. 6(*f*).

As shown in FIG. 5, the means for generating an initial estimate of the estimated mixing matrix Â 208 (as depicted in FIG. 2) is illustrated in with greater specificity. As was the case during the discussion of FIG. 2, the "means" described here are typically in the form of computer program code operating on the mixed signal data in a series of steps. The parts of the means 208 may be operated, for example, as specific subroutines in a larger program.

The means 208 comprises a means for transforming the mixed signal matrix X into the sparse domain using a transform operator 500. In a preferred embodiment, the means 500 is a Fourier transform operator (e.g., a spectrogram) for transforming the mixed signal matrix X into the frequency domain. To illustrate the benefits of transforming the mixed signal matrix X into the sparse domain, an example scatter plot of original mixed data is presented in FIG. 6(*a*). The scatter plot is obtained by plotting the time domain values of one mixture $x_2$ versus the time domain values of the other mixture $x_1$. From this plot, it can be seen that the values form one cloud from which it is impossible to distinguish different source signals. Since examination of the time domain values provides no insight, it is better to examine the mixtures $x_1$ and $x_2$ in the frequency domain, where the data may be represented sparsely. The motivation for examining the received mixtures in the transform domain is that the application of either the Fourier domain (spectrogram) or the wavelet transform will result in a representation of the mixtures that is sparse and that yields information about the underlying source signals and how they are mixed together by the mixing matrix. The choice of the Fourier domain for the estimate mixing matrix Â is preferred because finer resolution can be obtained, and hence, a more accurate estimation of the mixing matrix Â can be generated. The observed signals are transformed to the Fourier domain by applying the spectrogram. In the examples provided herein, including the depictions in FIG. 6 and detailed further below, the spectrogram was computed using a Hamming window of length 16 samples. The window was shifted by 8 samples. The spectrogram transforms the observed mixture signals into frequency bands. The number of frequency bands is equal to half the length of the FFT+1 (Fast Fourier Transform+1) if the signals are real. Hence, in the example shown herein, there are 9 frequency bands.

Next, a means for determining a frequency band within the sparse domain that contains the most information that can be used to determine lines of correlation to determine the number of signal sources 502 is operated. A preferred mechanism for this determination is a mutual information criterion. This means 502 is applied to determine which frequency band provides the most information about the lines of correlation of the source signals from the spectrogram values of the mixtures $x_1$ and $x_2$. This frequency band is determined by applying the maximum mutual information criterion. Mutual information is a measure of uncertainty remaining about an observation (event) Z, for example, after observing another observation Y. It is defined as I(Z,Y)=H(Z)−H(Z|Y) where H(Z) is the entropy of Z, and is given by $$H(Z) = -\sum_{k=1}^{K} p(z_k)\log(p(z_k)) \text{ and } H(Z \mid Y)$$

is the conditional entropy, given by H(Z|Y)=H(Z,Y)−H(Y). By applying the mutual information criterion, a frequency sub-band may be found in which uncertainty about one observed mixture is maximally resolved by observing another mixture. In essence, by applying the maximum mutual information criterion a frequency sub-band is being found in which the directions of spread of observed mixtures are as well resolved as possible. Note that in the example just discussed, Z is the group of spectrogram values in a particular frequency band of $x_2$, and Y is the group of spectrogram values of $x_1$ from the same frequency band. By applying the mutual information criterion, a frequency band may be found in which uncertainty about one observed mixture is maximally resolved by observing another mixture. A bar graph depicting mutual information in each of several frequency sub-bands is presented in FIG. 6(*b*). The figure plots bars representing the mutual information versus the 9 frequency bands used for this example. From the graph, it is clear that frequency band #3 (the third bar from the left) has the highest mutual information. It can be seen by generating a scatter plot of the spectrogram values of $x_2$ vs. $x_1$ from frequency band #3, depicted in FIG. 6(c), the scatter plot shows some structure, and contains what appear to be three lines or directions of correlation, one for each source (highlighted by black lines in the figure). By applying the mutual information criterion, a frequency band in which the directions of correlations are as resolved as possible is found.

To further improve the resolution of these directions in the chosen frequency band, a thresholding technique is applied. Thus, a means for determining a measure and an optimal threshold for the measure for the determination of noise within the frequency band 504 is operated. A means for recalculating the measure used in the determination of the noise within the frequency band using the optimal threshold 506 is then operated. Because of the close relationship between means 504 and 506, they are described together here. The preferred form of the measure is a random variable $$ang = \arctan\frac{x_i(\text{band})}{x_j(\text{band})},$$

where $x_i(\text{band})$ and $x_j(\text{band})$ represent Fourier values of mixture in the selected frequency band. The optimal threshold in this case may be represented by ANG, which is determined by computing the entropy E(ang, ANG) vs. ANG and searching for the optimal value of ANG corresponding to the minimum rate of descent of the entropy E(ang, ANG).

After the mixtures are observed at the two sensors and transformed into the sparse domain, the random variable ang may be calculated. If the mixtures $x_1$ and $x_2$ were made from spatially white additive noise (e.g., a mixing matrix of 0), then the variable ang would have values that are uniformly distributed (indicating no "lines" of correlation). On the contrary, if the signal sources $s_1$, $s_2$, and $s_3$ are spatially localized sources with narrow variances in the selected frequency band, then the resulting distribution of the variable ang would be described by a multi-modal distribution with three peaks in the distribution corresponding to the directions of correlations introduced by the mixing matrix. Since both noise and localized sources are present in the example used herein, the effect of the noise is to potentially mask or hide the correlation directions and thereby prohibit determination of all of the correlation directions. The masking effect may be seen in FIG. 6(d), which is an angle histogram of the chosen sub-band in terms of the variable ang. The three vertical lines 600 correspond to the three directions depicted in the scatter plot of FIG. 6(c). Although it is possible to resolve the correlation directions of the source signals from the scatter plot of FIG. 6(c), it is not possible to resolve all of them from the histogram of the variable ang. If the spectral values due to noise that are in the center of FIG. 6(c), marked by a circle 602, could be removed by thresholding, then it would be possible to resolve all of the correlation directions. Therefore, it is desirable to apply thresholding to allow for resolution of all of the correlation directions. An angle histogram of the chosen sub-band is depicted in FIG. 6(d), from which it is clear that the thresholding operation applied to the observed mixtures should reduce the masking of the maxima of a histogram of ang.

The next issue is how to choose a value of the threshold. The approach used is based on measuring the entropy of the random variable ang as a function of a threshold ANG applied to the spectral values of the mixtures in the selected frequency band. Masking uniform distribution (the presence of noise) tends to increase the entropy. By increasing the threshold value, noise may be reduced and entropy decreased, eventually to a point where signal sources begin to be removed as well. A function, E(ang, ANG) is defined, equal to the entropy of ang obtained by thresholding the spectral values of the mixtures $x_1$ and $x_2$ with the threshold value set to ANG. The value of ANG is increased until the rate of descent of function E(ang, ANG) is minimum within a chosen set of values. The value ANG that minimized E(ang, ANG) is then selected as the threshold value to threshold the observed mixtures in the sparse Fourier domain. ANG, in this example, corresponds to a range of values between [0.1*Axb 2*Axb] where Axb=cov(spectal values in the chosen frequency sub-band). To compute E(ang, ANG), all spectral coefficients of the spectral values of the mixtures $x_1$ and $x_2$ in the selected frequency band whose magnitudes are less than or equal to ANG are set to 0. Next, ang is calculated, and a histogram is generated for the values of ang. Then for each set threshold value, E(ang, ANG) is computed using the entropy definition mentioned above along with the histogram values of ang. An Entropy plot depicting threshold selection at a point of minimum entropy is depicted in FIG. 6(e). The threshold value corresponding to the minimum rate of descent of the entropy function E(ang, ANG) is selected automatically, and is represented in the FIG. 6(e) by the minimum 604. An angle histogram of the chosen sub-band after thresholding is depicted in FIG. 6(f). From the histogram in FIG. 6(f), three local maxima are clearly visible, which correspond to three lines of correlation due to the mixing of the three source signals. These local maxima (both the number of local maxima and their location) are automatically detected and the resulting angles θ are used to create the initial estimate of the estimated mixing matrix Â, where $$\hat{A}_{init}=[\cos(\theta); \sin(\theta)].$$

Finally, means for determining the local maxima of a distribution of the measure 508 is operated, where the local maxima represent angles which are inserted into the estimated mixing matrix Â to provide an initial estimate of the estimated mixing matrix Â. For this purpose, a standard peak detection technique may be used to determine the number and values of local maxima of a histogram of ang where the local maxima represent angles which are inserted into the estimated mixing matrix Â to provide an initial estimate of the estimated mixing matrix Â.

Next, a discussion of the joint optimization technique of the present invention is provided.

Figure 7:
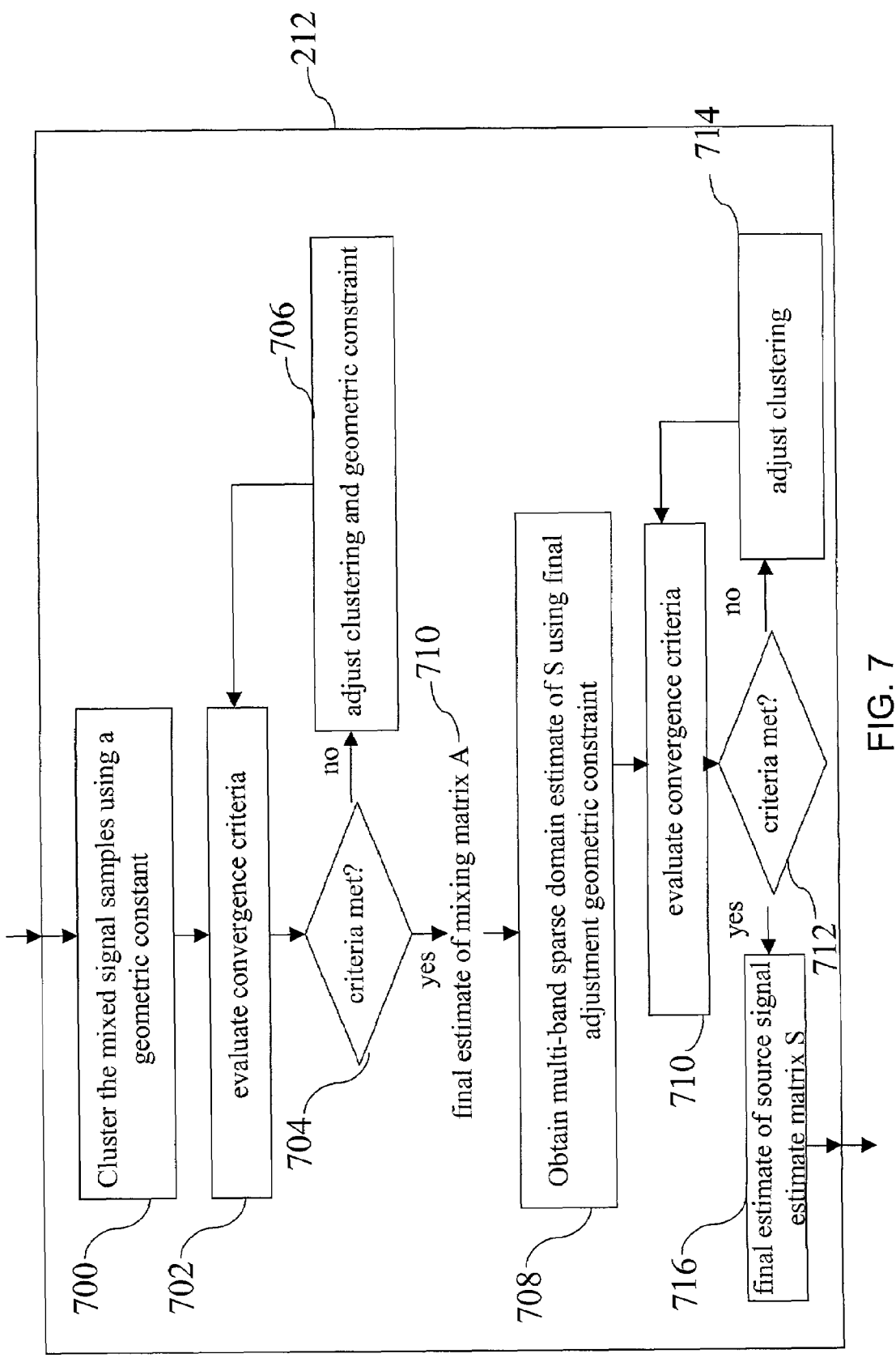
FIG. 7 is a more specific flow diagram depicting the operation of the present invention, illustrating a preferred embodiment for jointly and iteratively optimizing the estimated mixing matrix Â and the source signal estimate matrix Ŝ.

(5) Jointly Optimizing the Initial Estimated Mixing Matrix Â and the Source Signal Estimate Matrix Ŝ, and Restoring the Signals A more specific flow diagram depicting the operation of a preferred embodiment for jointly and iteratively optimizing the estimated mixing matrix Â and the source signal estimate matrix Ŝ is depicted in FIG. 7. The flow chart depicted in FIG. 7 corresponds to the means for jointly optimizing the source signal estimate matrix Ŝ and the estimated mixing matrix Â in an iterative manner 212 depicted in FIG. 2. As previously mentioned in regard to the generation of the initial estimate of the estimated mixing matrix Â, the "means" discussed herein are typically in the form of computer program code operating in a data processing system which operates generally in a series of steps.

First, in the optimization of the estimated mixing matrix $\hat{A}$ a means for clustering the mixed signal samples is performed using a geometric constraint 700 is operated, preferably in the Fourier domain, along with the lines of correlation. This is preferably accomplished using one cluster per source along with a straight distance metric geometric constraint, with the clusters representing estimates of the Fourier domain representation of $\hat{S}$, $F(\hat{S})$, where F represents a Fourier domain operator.

Next, a means for evaluating a convergence criteria based on the clustered mixed signal samples 702 is used to determine whether the convergence criteria are met, and if the convergence criteria are not met 704, iteratively adjusting the clustering of the mixed signal samples and parameters of the geometric constraint 706 to create a new set of clusters until the convergence criteria are met 704, to provide a final estimated mixing matrix $\hat{A}$. The convergence criteria is preferably in the form, min $\lambda c^T |F(\hat{S})|$, and is developed from the log likelihood function $L(F(\hat{S})|F(X),A)$ with the assumption of Laplanicity of source signals in the Fourier domain following the probability $$P(F(S)) = \frac{\lambda}{2} e^{-\lambda c^T |F(\hat{S})|},$$

where $c^T = [1, 1, \ldots 1]$ is a unit vector. This convergence criteria, min $\lambda c^T |F(\hat{S})|$, is evaluated based on the clustered mixed signal samples to determine whether it is met, and it is not, the clustering of the mixed signal samples is iteratively adjusted along with parameters of the geometric constraint to create a new set of clusters until convergence occurs. The result is a final estimated mixing matrix $\hat{A}$.

Next, in the optimization of the estimate of the source signal estimate matrix $\hat{S}$ a means for obtaining a multi-band sparse domain estimate of the source signal estimate matrix $\hat{S}$ using the relationship $X = \hat{A}\hat{S} + V$ 708 is operated, preferably in the wavelet domain.

Next, a means for using the adjusted geometric constraint corresponding to the final estimated mixing matrix $\hat{A}$ in each of the bands of the sparse domain for the source signal estimate matrix $\hat{S}$ 710 is used, and a determination is made regarding whether a convergence criteria is met 712 for the source signal estimate matrix $\hat{S}$, and if the convergence criteria are not met 712, iteratively adjusting the clustering of the mixed signal samples to create a new set of clusters 714 until the convergence criteria are met, to provide a final source signal estimate matrix $\hat{S}$. The adjusted geometric constraint corresponding to the final estimated mixing matrix $\hat{A}$ is used in each of the bands of the Wavelet domain for the source signal estimate matrix $\hat{S}$, $W(\hat{S})$. The convergence criteria is preferably in the form min $\lambda c^T |W(\hat{S})|$. The convergence criteria, min $\lambda c^T |W(\hat{S})|$, is developed from the log likelihood function $L(W(\hat{S})|W(X),A)$ with the assumption of Laplanicity of source signals in the Wavelet domain following the probability $$P(W(S)) = \frac{\lambda}{2} e^{-\lambda c^T |W(\hat{S})|},$$

where $c^T = [1, 1, \ldots 1]$ is a unit vector. If the convergence criteria is not met, the clustering of the mixed signal samples is iteratively adjusted to create a new set of clusters until the convergence criteria, $\lambda c^T |W(\hat{S})|$, is met, providing a final source signal estimate matrix $\hat{S}$. Greater detail with regard to the joint optimization is provided below.

For the joint optimization problem, it is assumed that the source signals are statistically independent of each other and follow a Laplacian probability distribution function in the sparse Fourier and wavelet domains. It has been generally observed that the Fourier and wavelet coefficients of signals do exhibit Laplacian behavior. It is also assumed that noise V is Gaussian (i.e., normally distributed). These are not strong assumptions since in practice source signals are generally statistically independent of each other and are normally distributed.

In order to reduce the complexity of the problem of separation of mixed signals, the sparse domain is used by applying the wavelet/short-time Fourier transform. This has another advantage of reducing the noise effect—by thresholding the wavelet/Fourier coefficients we can achieve denoising. The probabilistic approach of blind source separation discussed herein is then applied. The observed mixed signals in the transformed domain can be written as: $W(X) = AW(S) + W(V)$ where W is either the Fourier or wavelet transform. This has the same form as the mixed observed signals in the time domain. Therefore, without loss of generality, the problem of blind source separation in the signal domain and in the transformed sparse domain can be considered equivalent. Therefore, the general probabilistic approach mentioned in the previous section applies in the transformed sparse domain. To get the separated source signals back from the transformed domain to the time domain, the inverse wavelet or Fourier transform is applied.

For the development of theory of joint optimization, the log likelihood function $L(W(S)|W(X),A)$ in the sparse domain is used. This theory is described briefly below to provide a better background for the reader. This joint optimization algorithm is generally referred to as the "dual update technique" herein.

(5)(a) The Dual Update Technique

Laplanicity of source signals in the sparse domain is assumed to follow the prior probability $$P(W(S)) = \frac{\lambda}{2} e^{-\lambda c^T |W(\hat{S})|},$$

where $c^T = [1, 1, \ldots 1]$ is a unit vector. By applying the "Laplanicity" of signals, "Gaussianity" of noise and no prior information on A, it can be shown that:

$L(W(S)|A,W(X)) = (W(X) - AW(S))^T R_{W(v)}^{-1} (W(X) - AW(S)) + \lambda c^T W(S)$ where $R_{W(v)}$ is the noise covariance matrix. For the mathematical simplicity, it is assumed that the noise covariance matrix is an identity matrix. However, the proposed "dual update" approach works for non-Gaussian noise with covariance greater than unity. With unit covariance assumption and re-writing the above equation in terms of $t = 1, 2, \ldots T$ the result is:

$$L(W(S) | W(X), A) = \sum_{t=1}^{T} (W(x_t) - AW(s_t))^2 + \lambda c^T W(s_t), \quad (1)$$

where $x_t$ and $s_t$ are the column vectors of X and S. For the estimation of the unknown mixing matrix A, the above equation is differentiated with respect to A and set equal to zero. By doing this, $$\frac{\partial L(W(S) \mid W(X), A)}{\partial A} = 2\sum_{t=1}^{T}(W(x_t) - AW(s_t))^T W(s_t^j) = 0$$

is obtained. By using the individual components of W(S), A and by replacing the summation with the expectation operation, this equation can be written as $$E\{W(x_t)^T W(s_t^i)\} = E\left\{\left(\sum_{j=1}^{M} a_j^T W(s_t^j)^T\right) W(s_t^j)\right\}.$$

$$E\{W(s_t^i)^T W(s_t^j)\} = 0 \text{ for } i \neq j$$

based on the assumption that the source signals are statistically independent in the sparse domain. Using this result, the equation immediately above can be written as:

$\Sigma_{XS} = [a_1, a_2, \ldots a_M]\Sigma_S$ where $\Sigma_S$ is the cov(W(S))=E{W(S)$^T$W(S)} and $\Sigma_{XS}$=E{W(X)$^T$W(S)}=[$\sigma_{Xs_1}, \sigma_{Xs_2} \ldots \sigma_{Xs_N}$]. The estimated A matrix becomes:

$$\hat{A} = [\hat{a}_1, \hat{a}_2 \ldots \hat{a}_M] = \Sigma_{XS}\Sigma_S^{-1} \text{ or } \hat{A}\,\Sigma_S = \Sigma_{XS}. \quad (2)$$

Equation (2) can be viewed as a constraint on the values of S, such that if A is chosen according to equation (2), then the first term in equation (1) will be minimized with respect to A. Equation (2) also provides a means for estimating A, given an estimate of S, which is used to refine the estimate of A.

There is no closed form solution to solve this set of equations. However, they can be solved by applying the Linear Equality Constraints (LEC) optimization technique. A comprehensive treatment of the LEC is provided in P. E. Gill, W. Murray and M. H. Wright, *Practical optimization*, Chapter 3, Academic Press, 1981. LEC techniques are well known in the literature, and generally correspond to the following general framework:

$$\underset{x \in \mathcal{R}^n}{\text{minimize}} \, F(x)$$

subject to $\hat{B}x = \hat{c}$ where B is an m×n matrix and its $i^{th}$ row is denoted by $\hat{b}_i^T$ that contains the coefficients of the $i^{th}$ linear contraint: $\hat{b}_i^T x = \hat{a}_{i1}x_1 + \hat{a}_{i2}x_2 + \ldots + \hat{a}_{in}x_n = \hat{c}_i$.

The LEC corresponds to finding x under the linearity constraint such that some function of x F(x) is minimized. However, to apply the constraint, it is necessary to know a $\hat{B}$ that corresponds to finding lines or directions of lines. It has been shown that the necessary condition for F(x*) to be a local minimum of LEC for some feasible x*, its projected gradient vector at x* should be equal to zero. Therefore, the LEC optimization problem can be solved by applying the line search together with the projection gradient method. An example of a method for finding the lines or direction of the lines is by applying Armijo rules of line search. This technique is preferred for use with the present invention.

By applying the above described LEC, Equation (1) iteratively by using the following two steps:
1. Find $W(\hat{S})$ that minimizes $\lambda c^T |W(\hat{S})|$, which corresponds to minimizing $F(W(\hat{S}))$, under the linear constraint $\hat{A}\Sigma_s = \Sigma_{XS}$ from equation (2) for a given choice of A; and
2. Use $W(\hat{S})$ and estimate $\hat{A} = \Sigma_{XS}\Sigma_S^{-1}$, which corresponds to finding lines or directions of lines.

The goal of this general approach is to determine feasible directions to search in, namely a direction that meets linear equality constraints. Once feasible directions have been found, an update step along the feasible directions is calculated, with the effect of decreasing the value of the function being minimized. These two steps are iterated until a convergence criterion is met. Specifically, from the above set of equations, it can be seen that a good initial estimate of A is needed to get a good estimate of S, i.e. the $\hat{S}$ that is used in the step 1 above. As mentioned above it is of interest to find directions of lines (angles of lines). Therefore, the A matrix is considered as a function of as a function of θ.

In summary, the joint optimization technique works as follows:
1. From the knowledge of the estimated mixing matrix $\hat{A}$, the number of signal sources and their lines or directions are known;
2. Clusters are developed along the lines of correlation with one cluster for each source signal. Every spectrogram value in the selected frequency band is assigned to a cluster (in this case, the clusters are two-dimensional plots of $x_1$ and $x_2$). As an initial guess, the spectrogram values of $x_1$ and $x_2$ are assigned to a cluster on the basis of a straight distance matrix (other techniques known in the art could also be substituted). The clusters represent estimates of $W(\hat{S})$;
3. Using the current estimate of $W(\hat{S})$, the function $\lambda c^T |W(\hat{S})|$ is evaluated to determine if a convergence has been reached. If the convergence criterion is not met, then step 2 is performed again to adjust the assignment of the spectrogram values of $x_1$ and $x_2$ to create a new estimate of $W(\hat{S})$. Creating clusters of the spectrogram values along the lines of correlation specified by the mixing matrix A ensures that the constraint imposed by equation 2 (above) is met.

(5)(b) Time-Courses Restoration of the Source Signals

The next step in the proposed over-complete blind source separation is the restoration of separated source signals. For this, the final estimate of A obtained from the technique described in the last section is used, and the observed signals are transformed into wavelet sparse domain. Note that throughout this description that, although the Fourier and wavelet domains are preferred, any other transform into a sparse domain may be used. The wavelet sparse domain is used for the reconstruction of source signals because in the case of the spectrogram, the phase information is lost and the restored separated source signals will not be accurate. The question arises, why not apply the proposed "dual update" technique in the wavelet sparse domain and estimate both A and restore the separated source signals? This could be done; however, the proposed dual update technique will estimate A up to permutations which require finding the proper order for the source signal separation in each wavelet sub-band. In order to overcome this problem the "dual update" technique is applied twice—once in the sparse Fourier domain and once in the sparse wavelet domain. Only the final estimate of A matrix that resulted after the "dual update" technique satisfies the stopping criterion in the Fourier domain is kept.

This matrix is fixed while restoring the source signals in the wavelet domain and minimizing the log likelihood function $$\min_{W(S)} (L(W(S) | A, W(X)))$$  (5)

where W(S) is the transformed version of S in the wavelet domain and W(X) is the transformed version of X in the wavelet domain. As described above, equation (2) is used as the linear constraint on W(X). The minimization problem is solved using the same techniques that were used to solve the minimization problem in the Fourier domain. The only difference in this case is that the estimate of A is not changed, only S is updated.

The iterative procedure is stopped when the criterion is met. For this minimization the Armijo line search rule is preferred.

In summary, the steps followed thus far are:
1. Create an initial estimate of the mixing matrix A using the Fourier domain with spectrogram coefficients in the frequency band that is determined to provide the best separation information, noting that the technique used to create the initial estimate of A automatically determines the number of sources (N);
2. Create a final estimate of the mixing matrix A using the dual update technique in the Fourier domain; and
3. Create an estimate of the source signal matrix S using the dual update algorithm applied in the wavelet domain to generate the reconstructed signals.

In the estimation theory it is well known that a good estimator is the one whose estimation error variance is close to the theoretical Cramer-Rao bound (CRB). The performance of the present invention may be evaluated by comparing it with the CRB. For this comparison it is necessary to provide an apparatus for generating the CRB. In the next two sections, the derivation of the CRB for A and S are provided, respectively.

(6) Developing the Theoretical Crame-Rao (CR) Bound for the Initial Estimated Mixing Matrix $\hat{A}$ In general $A=[a_1\ a_2\ \ldots\ a_N]$ where $a_i$ is a column vector of size M. As mentioned before, the angle of directions are of interest here. In other words the angle of directions of each columns of A must be determined. For mathematical simplicity consider a two sensors case. This case has been considered throughout this description for ease of visualization, but in general, the number of sensors with which the present invention is useful is unlimited. In this case, $$A = [a_1 a_2] \text{ where } a_i = \begin{bmatrix} a_{1i} \\ a_{2i} \end{bmatrix} \text{ with } i = 1, 2, \ldots M \text{ and}$$

$$\theta_i = \arctan\left(\frac{a_i}{\|a_i\|}\right).$$

Thus, $$u(\theta_i) = \begin{bmatrix} \cos(\theta_i) \\ \sin(\theta_i) \end{bmatrix}.$$

Since directions are of primary interest, the matrix A is considered in the form $A=A(\theta)=u(\theta_i)$. Now, consider the derivative of A with respect to $\theta_i$.

$$\frac{\partial}{\partial \theta_i} A(\theta) = \frac{\partial}{\partial \theta_i} u(\theta_i)$$

$$= \frac{\partial}{\partial \theta_i} \begin{bmatrix} \cos(\theta_i) \\ \sin(\theta_i) \end{bmatrix}$$

$$= \begin{bmatrix} -\sin(\theta_i) \\ \cos(\theta_i) \end{bmatrix}$$

$$= \begin{bmatrix} 0 & -1 \\ 1 & 0 \end{bmatrix} \begin{bmatrix} \cos(\theta_i) \\ \sin(\theta_i) \end{bmatrix}$$

$$= pu(\theta_i) \text{ where } p = \begin{bmatrix} 0 & -1 \\ 1 & 0 \end{bmatrix}$$

Next consider that $$\frac{\partial}{\partial \theta_i} (W(X) - A(\theta)W(S)) = \frac{\partial}{\partial \theta_i} \left( W(X) - \sum_i u(\theta_i) W(s_i) \right) = -pu(\theta_i) s_i,$$

and that $$\frac{\partial}{\partial \theta_i} [(W(X) - A(\theta)W(S))^T R_{W(V)}^{-1} (W(X) - A(\theta)W(S))] =$$

$$-[pu(\theta_i)]^T (W(X) - A(\theta)W(S))W(s_i).$$

Thus, $$\frac{\partial^2}{\partial \theta_i^2} [(W(X) - A(\theta)W(S))^T R_{W(V)}^{-1} (W(X) - A(\theta)W(S))] =$$  (3)

$$-\frac{\partial u(\theta_i)}{\partial \theta_i} p^T R_{W(V)}^{-1} (W(X) - A(\theta)W(S))W(s_i) +$$

$$u^T(\theta_i) p^{T^T} R_{W(V)}^{-1} pu(\theta_i) W(s_i)^2.$$

Now for the CRB derivation, consider the log likelihood function $$L(W(S) | W(X), A(\theta)) =$$

$$\sum_{t=1}^{T} (W(x_t) - A(\theta)W(s_t))^T R_{W(V)}^{-1} (W(x_t) - A(\theta)W(s_t)) + \sum_{t=1}^{T} \lambda c^T W(s_t)$$

that is used for the estimation of A and S. The second order differentiation of this likelihood function with respect to $\theta$ is as follows:

$$\frac{\partial^2 L(W(S) | W(X) A(\theta))}{\partial \theta_i^2} =$$

$$\frac{\partial^2 \sum_{t=1}^{T} (W(x_t) - A(\theta)W(s_t))^T R_{W(V)}^{-1} (W(x_t) - A(\theta)W(s_t))}{\partial \theta_i^2}$$

since the second term does not depend on $\theta$. Substituting from equation (3), the above equation can be shown to be:

$$\frac{\partial^2 L(W(S) \mid W(X)A(\theta))}{\partial \theta_i^2} = -\frac{\partial u^T(\theta_i)}{\partial \theta_i} p^T R_{W(V)}^{-1}(W(X) - A(\theta)W(S))W(s_i) +$$

$$u^T(\theta_i)p^{T^T} R_{W(V)}^{-1} pu(\theta_i)W(s_i)^2 =$$

$$\sum_{t=1}^{T} \{s_t^i u^T(\theta_i)p^T p^T R_{W(V)}^{-1}(W(x_t - A(\theta)s_t^i) + u^T(\theta_i)p^T R_{W(V)}^{-1} pu(\theta_i)s_t^{i^2}\}.$$

It is well known in estimation theory that the CR bound is the inverse of a Fisher information matrix. The Fisher information matrix is $$I = \left[ E\left\{ \frac{\partial^2 L}{\partial \theta_i \partial \theta_k} \right\} \right]$$

where E is the expectation operator, L is the log likelihood function, and θ is the parameter vector that is being estimated. By applying the expectation operation on the above second-order derivative, $$E\left\{ \frac{\partial^2 L(W(S) \mid W(X)A(\theta))}{\partial \theta_i^2} \right\} = \sum_{t=1}^{T} \{u^T(\theta_i)p^T R_{W(V)}^{-1} pu(\theta_i)E\{s_t^{i^2}\}\}$$

is obtained. It can be shown that $$E\{s_t^{i^2}\} = \frac{2}{\lambda_k^2}.$$

Substituting for $E\{s_t^{i^2}\}$, $$E\left\{ \frac{\partial^2 L(W(S) \mid W(X)A(\theta))}{\partial \theta_i^2} \right\} = u^T(\theta_i)p^T R_{W(V)}^{-1} pu(\theta_i)\frac{2T}{\lambda_k^2}.$$

Since $E\{W(s_t^i)W(s_t^j)\}=0$, all other terms of the Fisher information matrix except the diagonal elements can be shown to be zero. Therefore, the CR bound for the estimation of $\theta_i$ is given by $$E\{(\theta_i - \hat{\theta}_i)^2\} \geq \frac{\lambda_k^2}{2Tu^T(\theta_i)p^T R_{W(V)}^{-1} pu(\theta_i)}.$$

Assuming the following structure for the noise covariance:

$$R_{W(V)} = \begin{bmatrix} \sigma_{W(V)}^2 & \rho\sigma_{W(V)}^2 \\ \rho\sigma_{W(V)}^2 & \sigma_{W(V)}^2 \end{bmatrix},$$

the CR bound can be expressed as a function of mixture signal-to-noise ratio $$(SNR) = \frac{\frac{1}{\lambda_i^2}}{\sigma_{W(V)}^2} = \frac{1}{\lambda_i^2 \sigma_{W(V)}^2}.$$

Using this result, the CR bound for $\theta_i$ this:

$$E\{(\theta_i - \hat{\theta}_i)^2\} \geq \frac{\frac{1}{SNR}}{2Tu^T(\theta_i)p^T pu(\theta_i)} \quad (4)$$

Figure 8:
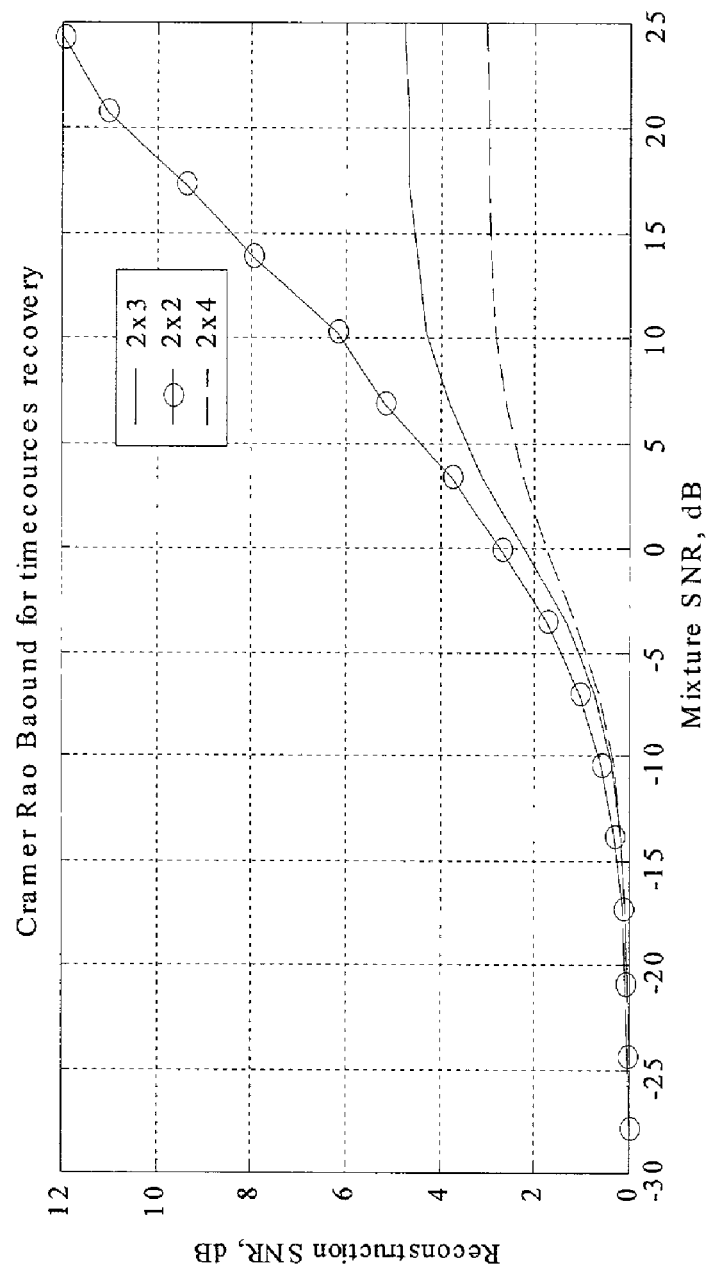
FIG. 8 is a graph depicting the application of the Crame-Rao (CR) bound apparatus of the present invention to develop CR bound curves of estimated source signals for different sizes of an estimated mixing matrix Â.

From Equation 4, it can be seen that the CRB for the estimate of A matrix depends on the length of data T that is used in its estimation. In FIG. 8, the theoretical bound is plotted with respect to the data length (e.g., matrix size). More specifically, FIG. 8 is a graph illustrating the application of the CR bound apparatus of the present invention applied to an example estimated mixing matrix $\hat{A}$, depicting the experimental bound when the number of signal samples is 1600;

(7) Developing the Theoretical Crame-Rao (CR) Bound for the Source Signal Estimate Matrix $\hat{S}$ This derivation is similar to that developed in the last section. Instead of differentiating the log likelihood function with respect to $\theta_i$, here it is differentiated with respect to $S$. This second order differentiation is given by:

$$\frac{\partial^2 L(W(S) \mid W(X)A(\theta))}{\partial^2 W(S)} = A^T(\theta)R_{W(V)}^{-1}(W(X) - A(\theta)S) \quad (5)$$

$$(W(X) - A(\theta)S)^T R_{W(V)}^{-1^T} A(\theta) -$$

$$\lambda \text{sign}(W(S))(W(X) - A(\theta)S)^T$$

$$R_{W(V)}^{-1^T} A(\theta) - \lambda A^T(\theta) R_{W(V)}^{-1}$$

$$(W(X) - A(\theta)S)\text{sign}(W(S^T)) +$$

$$\lambda^2 \text{sign}(W(S))\text{sign}(W(S))^T$$

Applying an expectation operation to the above equation and assuming that S is statistically independent of noise and that the noise has zero mean, equation 5 may be written as:

$$E\left\{ \frac{\partial^2 L(W(S) \mid W(X)A(\theta))}{\partial^2 W(S)} \right\} = E\{A^T(\theta)R_{W(V)}^{-1}(W(X) - A(\theta)S)$$

$$(W(X) - A(\theta)S)^T R_{W(V)}^{-1^T} A(\theta)\} +$$

$$E\{\lambda^2 \text{sign}(W(S))\text{sign}(W(S))^T\}.$$

The first term in the above equation can be written as:

$E\{A^T(\theta)R_{W(V)}^{-1}(W(X)-A(\theta)S)(W(X)-A(\theta)S)^T R_{W(V)}^{-1^T} A(\theta)\} = A^T(\theta)R_{W(V)}^{-1} E\{(W(X)-A(\theta)S)(W(X)-A(\theta)S)^T\}R_{W(V)}^{-1^T} A(\theta) = A^T(\theta)R_{W(V)}^{-1} A(\theta)$ since $E\{(W(X)-A(\theta)S)(W(X)-A(\theta)S)^T\}=R_{W(V)}$.

The second term can be written as: $E\{\lambda^2 \text{sign}(W(S))\text{sign}(W(S))^T\}=\lambda^2 E\{\text{sign}(W(S))\text{sign}(W(S))^T\}=\lambda^2 I$, since sign(W(S)) is a binary random varible sign $$(W(S)) = \begin{cases} 1 & \text{with probability} = 0.5 \\ -1 & \text{with probability} = 0.5 \end{cases}.$$

Substituting for the first and the second term, $$E\left\{\frac{\partial^2 L(W(S) \mid W(X)A(\theta))}{\partial^2 W(S)}\right\} = A^T(\theta)R_{W(V)}^{-1T}A(\theta) + \lambda^2 I.$$

As in the last section all the elements in the Fisher's information matrix except the diagonal elements are zero. Substituting the above equation in the diagonal elements of Fisher's information matrix, using the same structure for the noise covariance matrix as in the last section and taking the inverse of the Fisher's information matrix, the CR bound for the estimate of W(S) is:

$$E\{(W(S) - W(\hat{S}))^2\} \geq \left(\sigma_v^2 \begin{bmatrix} 1 & \rho \\ \rho & 1 \end{bmatrix} A^T(\theta)A(\theta) + \lambda^2 I\right)^{-1} \quad (6)$$

From the above equation it is apparent that the accuracy of the estimate of the separated source signals depends on the angle of mixing matrix. In the FIG. 8, the CRB theoretical curves are plotted for different A matrices, where can be seen that when the matrix is 2×2, the bound increases with SNR; where as for other mixing matrix sizes the bound reaches a plateau. This indicates that in the case of regular blind source separation (i.e., where the number of sources is equal to number of sensors), theoretically it is possible to separate the source signals perfectly. However this is not the case for over-complete blind source separation (i.e., where the number of sensors is less than the number of sources).

An operational example of the present invention is described below using speech signals and noise signals as source signals, and two sensors (microphones). This example is provided to illustrate the use of the present invention in an example context. The example used describes the use of the present invention in a relatively simple case, and is not intended to restrict the scope of the invention in any manner.

(8) An Operational Example

Figure 9:
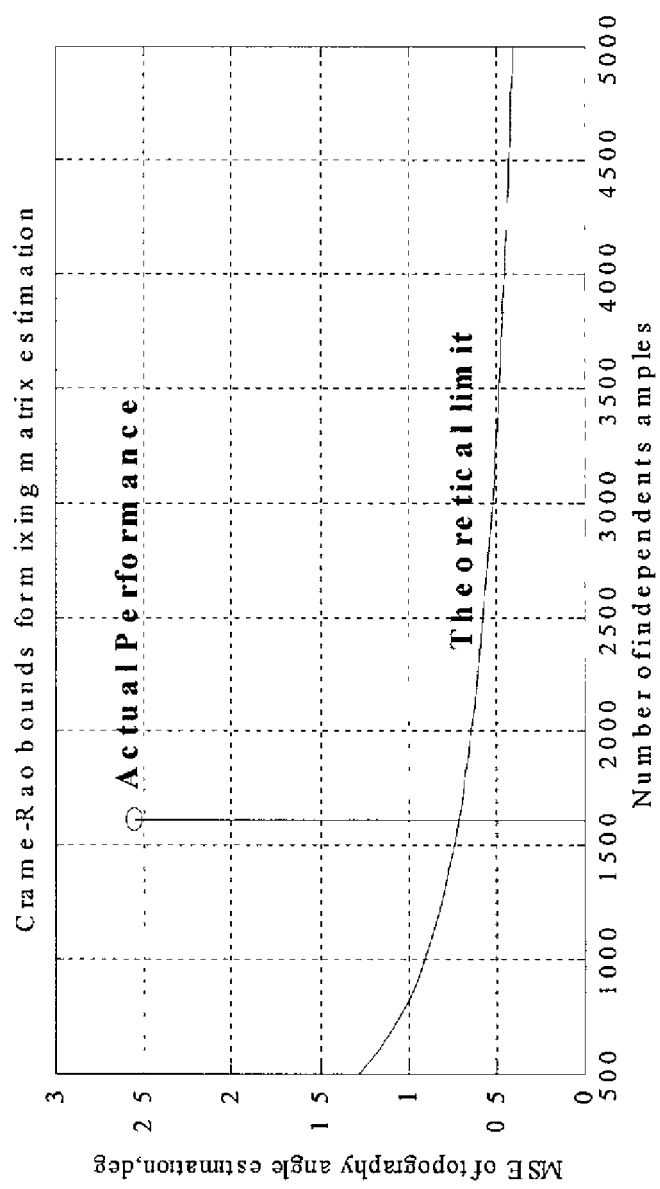
FIG. 9 is a graph illustrating the application of the CR bound apparatus of the present invention applied to an example estimated mixing matrix Â, depicting the experimental bound when the number of signal samples is 1600.

Two contexts were selected for this example. In the first, three speech signals from three female speakers were used. A noise signal was also included, corresponding to babble noise. The noise signal was considered as the noise source V. The noise source was randomly split into two parts to provide two noise source signals. The three speech signals and two noise signals were mixed by generating a 2×3 A matrix randomly. For the generation of this mixing matrix, first random numbers were generated using a uniform random number generator, these random numbers were then used in calculating the angles as mentioned above and these angles were next used in forming a A matrix. This mixing matrix was then used to mix three speech signals and two noise signals. As a result of this mixing two mixtures were developed corresponding to received signals at two sensors (microphones). From the two mixed signals, three speech signals were separated using the present invention. As mentioned above, this technique first estimates the A matrix in the Fourier domain by applying the dual update technique. The details of how the mixed signals were transformed to Fourier sparse domain and how the A matrix was estimated are provided above. To check how close the estimate of A matrix is to the theoretical CRB, the theoretical and the experimental bounds are plotted in FIG. 9. More specifically, FIG. 9 depicts a graph of the application of the Crame-Rao (CR) bound apparatus of the present invention to develop CR bound curves of estimated source signals for different sizes of an estimated mixing matrix Â. From this figure, it can be seen that the experimental (bound plotted at one SNR and one T) in the figure is close to the theoretical bound.

Figures 10, 10A:
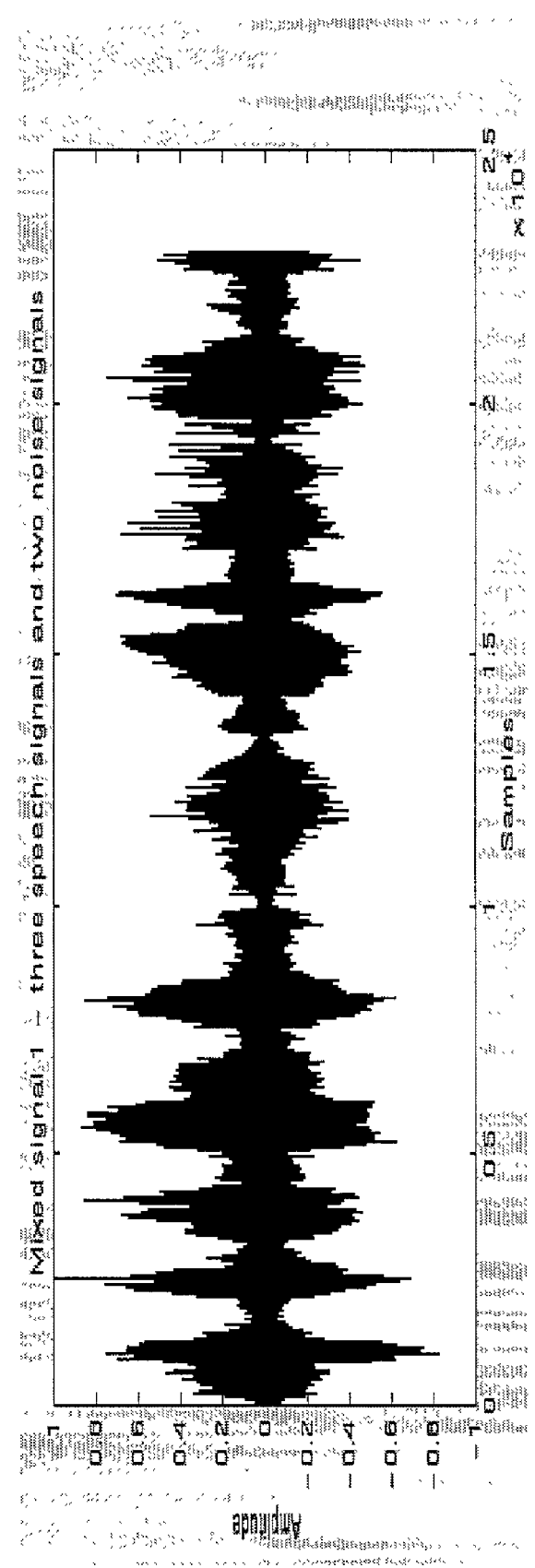
FIG. 10 is a series of graphs of amplitude versus time depicting the separation of signals from a mixture containing three speech signals mixed with two noise signals, with the aggregate mixed signal received at two sensors across an environment, where.
Figure 10:
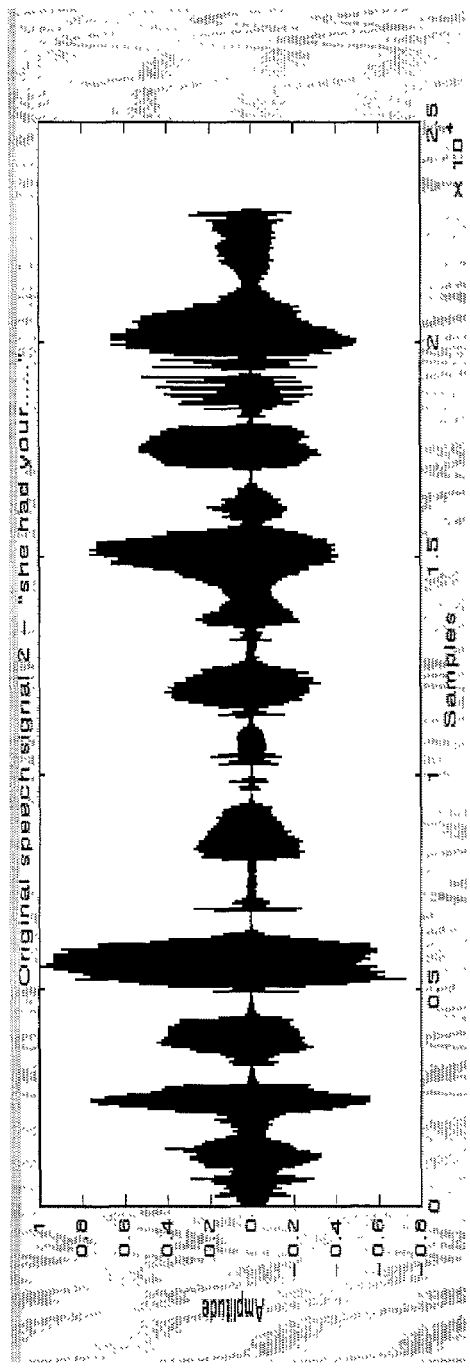
Figure 10:
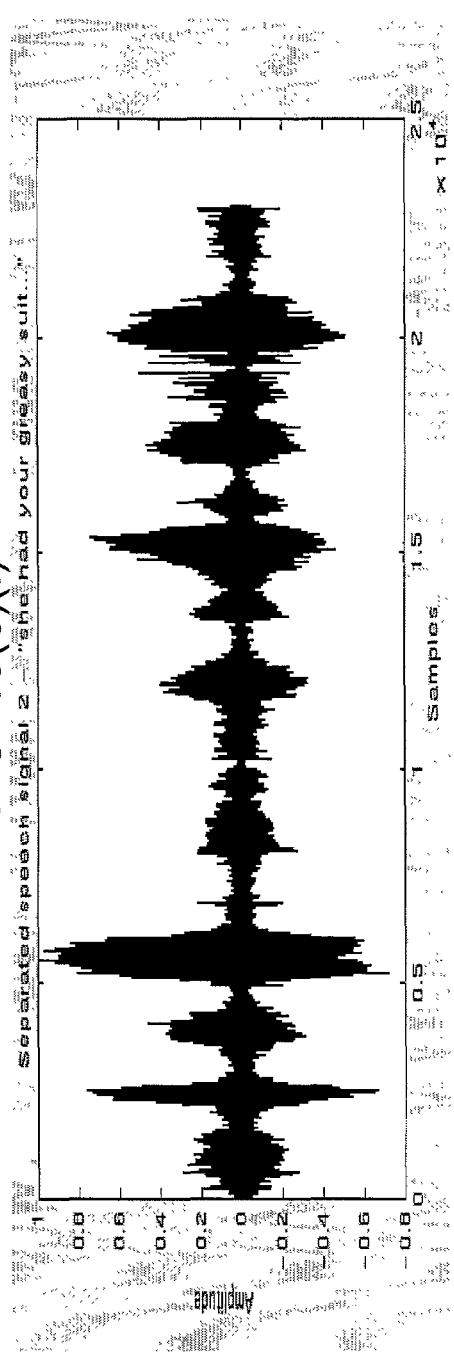
Figure 10:
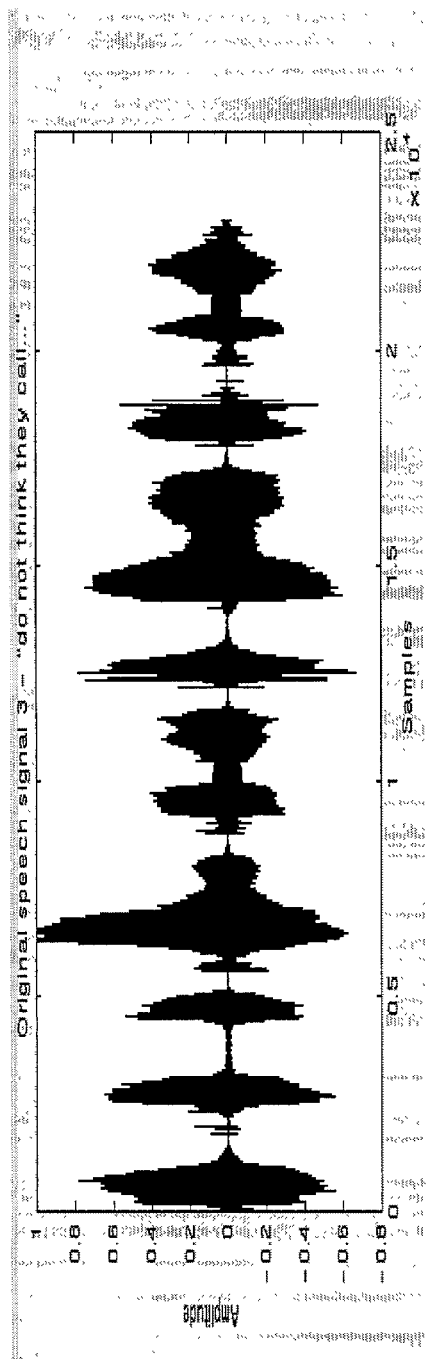
Figure 10:
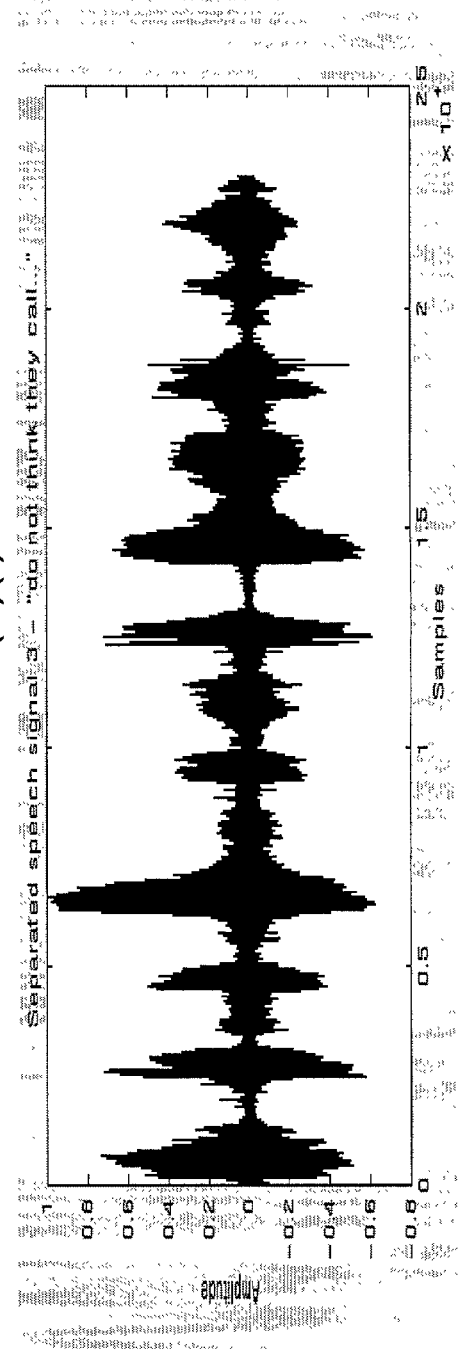

This estimated A matrix is then used to estimate the source signals. The source signals are estimated in the wavelet domain as mentioned above. For the application of the wavelet transform, a wavelet packet approach was used. The wavelet packet approach generates a library of bases for a given orthogonal wavelet function. Each of these bases offers a particular way of decomposing or representing (expanding) a signal. The most suitable decomposition of a given signal is then selected by applying the minimum entropy constraint. For the wavelet packet decomposition, a bi-orthogonal wavelet of order 6 was used. Both the spectrogram (sparse Fourier domain transformation) and the wavelet transforms are well known in the signal processing community. The dual update technique was applied in the wavelet sparse domain to estimate the source signals as described previously. The estimated source signals in the wavelet domain were transformed to the time domain by applying the inverse wavelet transform. The results are provided in FIG. 10, where FIG. 10 is a series of graphs of amplitude versus time depicting the separation of signals from a mixture containing three speech signals mixed with two noise signals, with the aggregate mixed signal received at two sensors across an environment, where:

FIG. 10(*a*) depicts the original mixed signal including the three English speech signals mixed with the two noise signals;

FIG. 10(*b*)(*i*) depicts a first original (unmixed) English speech signal;

FIG. 10(*b*)(*ii*) depicts the first English speech signal after separation, for comparison with the original depicted in FIG. 10(*b*)(*i*);

FIG. 10(*c*)(*i*) depicts a second original (unmixed) English speech signal;

FIG. 10(*c*)(*ii*) depicts the second English speech signal after separation, for comparison with the original depicted in FIG. 10(*c*)(*i*);

FIG. 10(*d*)(*i*) depicts a third original (unmixed) English speech signal; and FIG. 10(*d*)(*ii*) depicts the third English speech signal after separation, for comparison with the original depicted in FIG. 10(*d*)(*i*).

From the results shown in FIG. 10, it can be seen that the three speech signals are well separated from the mixed signal. In order to quantify how well the signals were separated, (a) SNR of mixed signals was computed as:

$$SNR_{s_{i_{mix_k}}} = 10\log_{10}\left(\frac{\text{var}(s_i)}{\text{var}(\text{mix}_k - s_i)}\right) \quad i = 1, 2, 3 \ \& \ k = 1, 2,$$

and (b) the SNR of estimated source signal was computed as:

$$SNR_{s_i} = 10\log_{10}\left(\frac{\text{var}(s_i)}{\text{var}(\hat{s}_i - s_i)}\right) \quad i = 1, 2, 3.$$

By comparing these two SNRs, an average enhancement of 11 dB was obtained.

Figures 11, 11A:
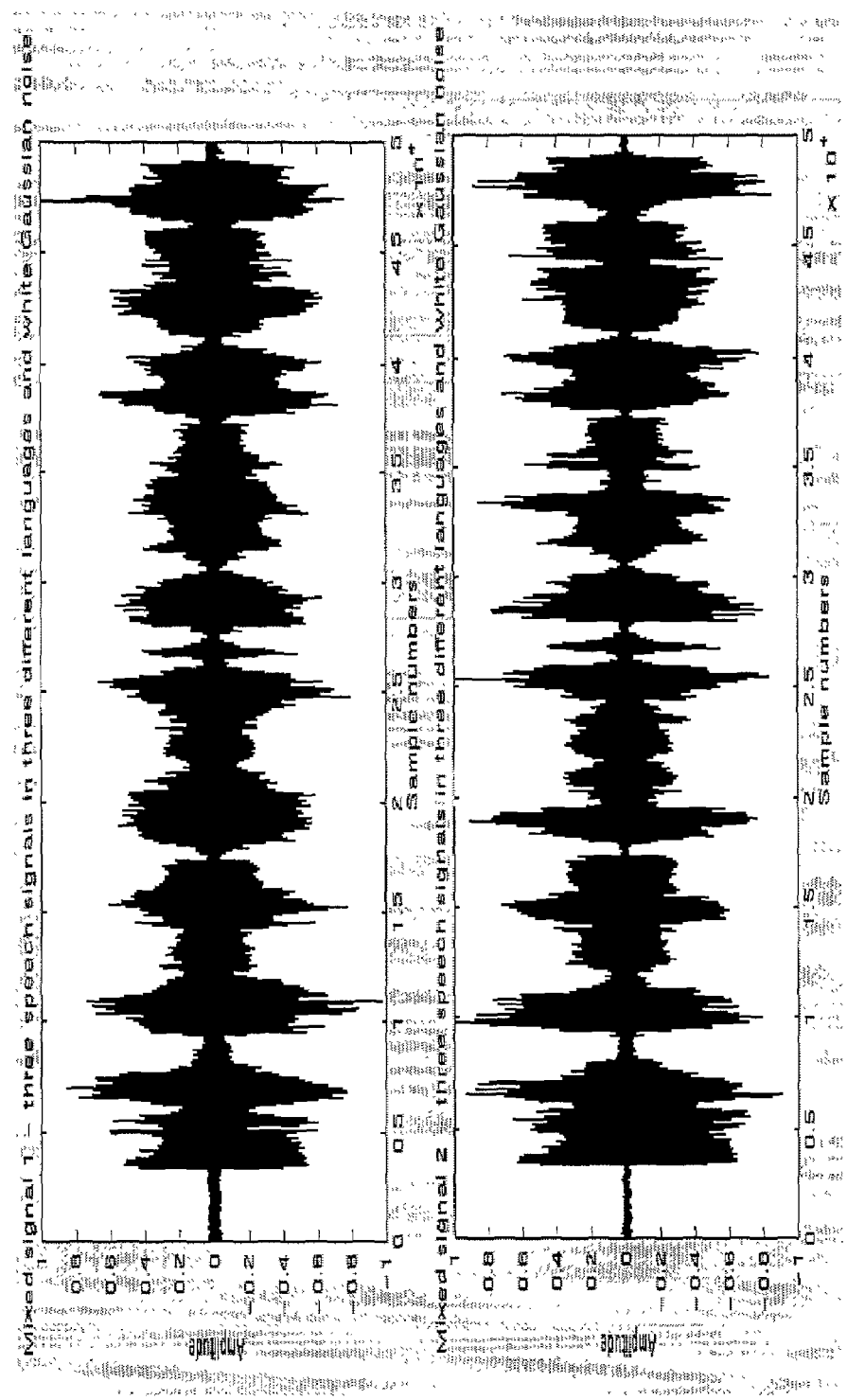
FIG. 11 is a series of graphs of amplitude versus time depicting the separation of signals from a mixture containing two mixed signals with three speech signals mixed with a Gaussian random noise signal, with the aggregate mixed signal received at two sensors across an environment, where.
Figure 11:
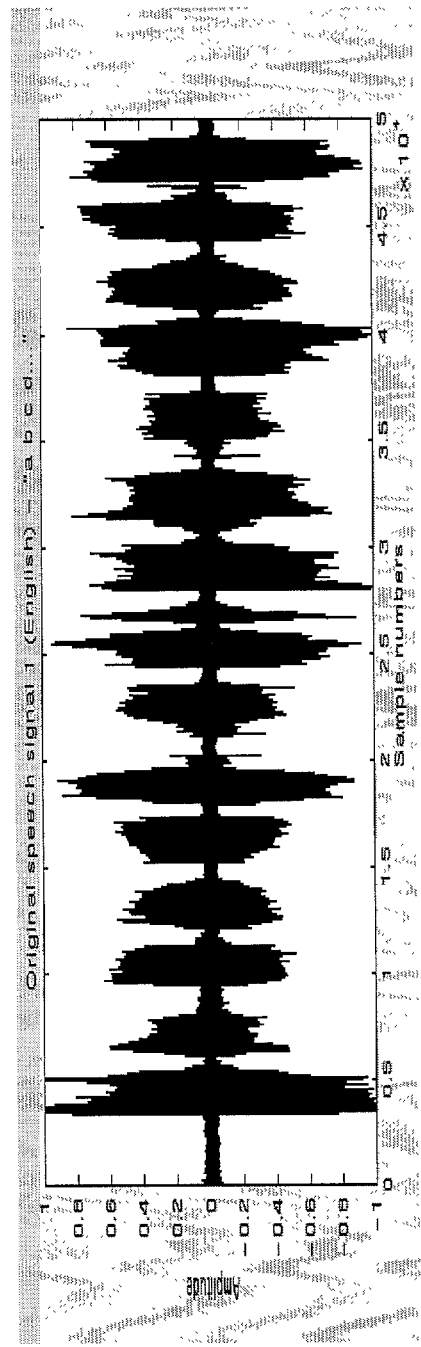
Figure 11:
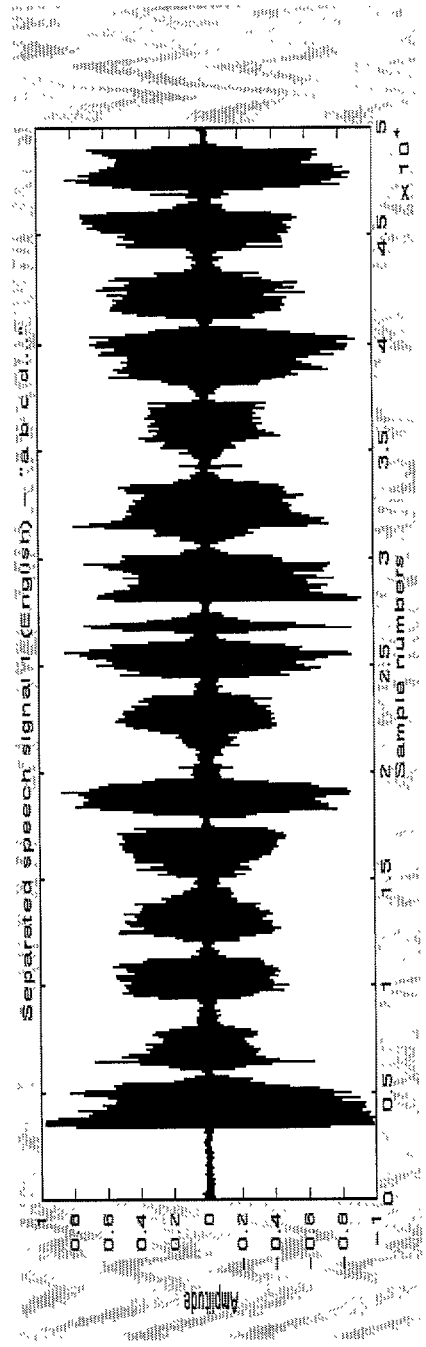
Figure 11:
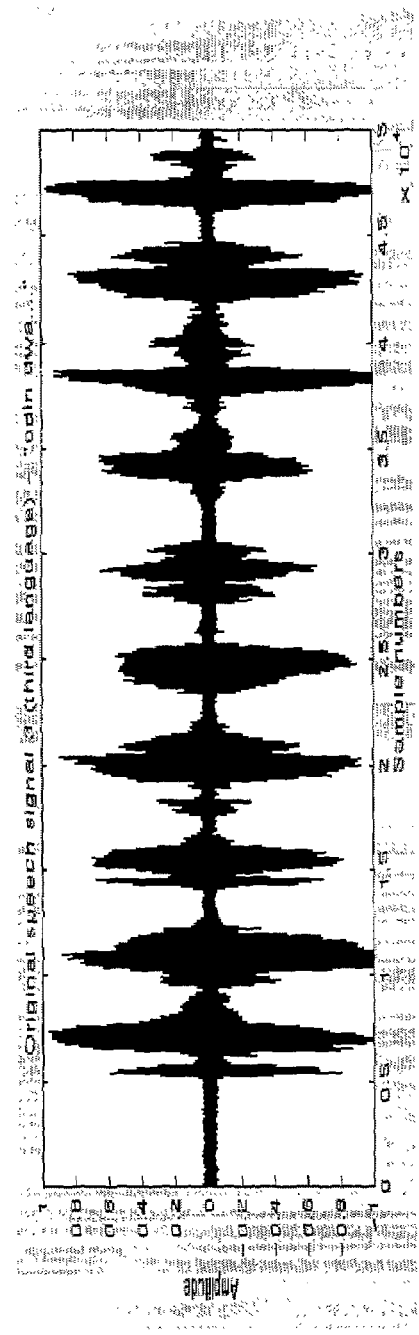
Figure 11:
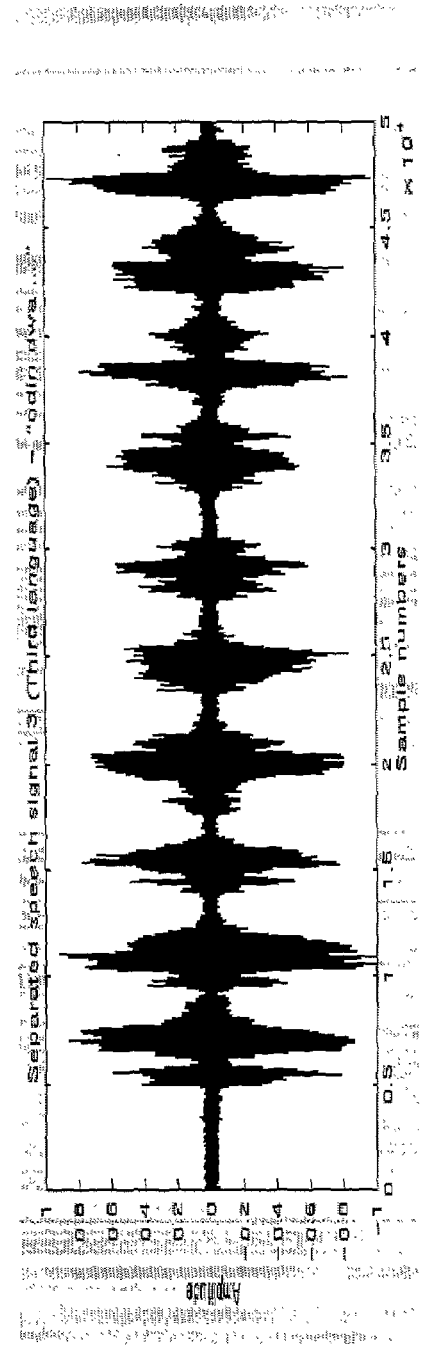

Next, in the second context, three speech signals of different languages—Spanish, English and Ukrainian—were used. Spanish and English sentences were spoken by two children and the Ukrainian was spoken by an adult male. In this case Gaussian random noise was used. A series of graphs of amplitude versus time depicting the separation of signals from a mixture containing two mixed signals with three speech signals mixed with a Gaussian random noise signal, with the aggregate mixed signal received at two sensors across an environment is depicted in FIG. 11, where:

FIG. 11(a) depicts the original two mixed signals including the three mixed language speech signals mixed with the two noise signals;

FIG. 11(b)(i) depicts a first original (unmixed) mixed language speech signal;

FIG. 11(b)(ii) depicts the first mixed language speech signal after separation, for comparison with the original depicted in FIG. 11 (b)(i);

FIG. 11(c)(i) depicts a second original (unmixed) mixed language speech signal;

FIG. 11(c)(ii) depicts the second mixed language speech signal after separation, for comparison with the original depicted in FIG. 11(c)(i);

FIG. 11(d)(i) depicts a third original (unmixed) mixed language speech signal; and FIG. 11(d)(ii) depicts the third mixed language speech signal after separation, for comparison with the original depicted in FIG. 11(d)(i).

From this figure, it can be seen that the three speech signals were well separated from the mixed signals. Once again, an average of 11 dB SNR enhancement was obtained.

From these two examples, it can be seen that this technique works well both for different types of noises and different speech signals (languages and speakers). Note that even though for mathematical simplicity in the derivations we assumed noise as Gaussian noise, the present invention performs well for non-Gaussian noise as indicated by the cases illustrated by FIG. 10.

The invention claimed is:

1. An apparatus for blind separation of an overcomplete set of mixed signals, the apparatus comprising:
    i. a data processing system including an input for receiving mixed signals from a plurality of sensors configured to receive mixed signal samples comprising a mixture of signals transmitted from signal sources through an environment and noise, a signal processor attached with the input for receiving the mixed signals from the sensors, and a memory for storing data during operations of the signal processor; the data processing system further comprising:
    ii. means for storing data representing the input from the sensors in a mixed signal matrix X;
    iii. means for storing data representing the noise in a noise matrix V;
    iv. means for storing data representing an estimate of the individual signals from the mixture of signals from the signal sources in a source signal estimate matrix $\hat{S}$;
    v. means for storing data representing an estimate of the effects of the environment in a estimated mixing matrix $\hat{A}$ where the matrices are related by X=$\hat{A}\hat{S}$+V;
    vi. means for generating an initial estimate of the estimated mixing matrix $\hat{A}$;
    vii. means for determining the number of signal sources and associated lines of correlation of each of the signal sources from the estimated mixing matrix $\hat{A}$, and for representing the signal sources in the source signal estimate matrix $\hat{S}$;
    viii. means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$; and
    ix. means for restoring the separated source signals from the optimized source signal estimate matrix $\hat{S}$, whereby a plurality of mixed signals from unknown sources traveling through an environment with added noise may be separated so that the original, separate signals may be reconstructed,
    wherein the means for generating an initial estimate of the estimated mixing matrix $\hat{A}$ comprises:
        i. means for transforming the mixed signal matrix X into the sparse domain using a transform operator;
        ii. means for determining a frequency band within the sparse domain that contains the most information that can be used to determine lines of correlation to determine the number of signal sources;
        iii. means for determining a measure and an optimal threshold for the measure for the determination of noise within the frequency band;
        iv. means for recalculating the measure used in the determination of the noise within the frequency band using the optimal threshold; and
        v. means for determining the local maxima of a distribution of the measure, where the local maxima represent angles which are inserted into the estimated mixing matrix $\hat{A}$ to provide an initial estimate of the estimated mixing matrix $\hat{A}$;
    wherein the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ comprises:
        i. means for clustering the mixed signal samples using a geometric constraint; and
        ii. means for evaluating a convergence criteria based on the clustered mixed signal samples to determine whether the convergence criteria are met, and if the convergence criteria are not met, iteratively adjusting the clustering of the mixed signal samples and parameters of the geometric constraint to create a new set of clusters until the convergence criteria are met, to provide a final estimated mixing matrix $\hat{A}$.

2. An apparatus for blind separation of an overcomplete set of mixed signals as set forth in claim 1, wherein the means for generating an initial estimate of the estimated mixing matrix $\hat{A}$ comprises:
    i. means for transforming the mixed signal matrix X into the frequency domain using a Fourier operator;
    ii. means for using a mutual information criterion to determine a frequency band within the sparse domain that contains the most information that can be used to determine lines of correlation to determine the number of signal sources;

iii. means for determining a random variable $$ang = \arctan \frac{x_i(\text{band})}{x_j(\text{band})},$$

where $x_i(\text{band})$ and $x_j(\text{band})$ represent Fourier values of mixture in the selected frequency band, and an optimal threshold ANG for ang, where the optimal threshold ANG is determined by computing the entropy E(ang, ANG) vs. ANG and searching for the optimal value of ANG corresponding to the minimum rate of descent of the entropy E(ang, ANG);

iv. means for recalculating ang based on the optimal threshold ANG;

v. means for using a standard peak detection technique to determine the number and values of local maxima of a histogram of ang where the local maxima represent angles which are inserted into the estimated mixing matrix $\hat{A}$ to provide an initial estimate of the estimated mixing matrix $\hat{A}$.

3. An apparatus for blind separation of an overcomplete set of mixed signals as set forth in claim 2, wherein the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ comprises:

i. means for clustering the mixed signal samples in the Fourier domain along the lines of correlation with one cluster per source using a straight distance metric geometric constraint, with the clusters representing estimates of the Fourier domain representation of $\hat{S}$, $F(\hat{S})$, where F represents a Fourier domain operator; and ii. means for evaluating a convergence criteria, min $\lambda c^T|F(\hat{S})|$, with the convergence criteria, min $\lambda c^T|F(\hat{S})|$, developed from the log likelihood function $L(F(\hat{S})|F(X),A)$ with the assumption of Laplanicity of source signals in the Fourier domain following the probability $$P(F(S)) = \frac{\lambda}{2} e^{-\lambda c^T|F(\hat{S})|},$$

where $c^T=[1, 1, \ldots 1]$ is a unit vector, with the convergence criteria, min $\lambda c^T|F(\hat{S})|$, evaluated based on the clustered mixed signal samples to determine whether the convergence criteria, min $\lambda c^T|F(\hat{S})|$, is met, and if the convergence criteria, min $\lambda c^T|F(\hat{S})|$, is not met, iteratively adjusting the clustering of the mixed signal samples and parameters of the geometric constraint to create a new set of clusters until the convergence criteria, min $\lambda c^T|F(\hat{S})|$, is met, to provide a final estimated mixing matrix $\hat{A}$.

4. An apparatus for blind separation of an overcomplete set of mixed signals as set forth in claim 3, wherein the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ further comprises:

i. means for obtaining a multi-band sparse domain estimate of the source signal estimate matrix $\hat{S}$ using the relationship $X=\hat{A}\hat{S}+V$, applied in the Wavelet domain; and ii. means for using the adjusted geometric constraint corresponding to the final estimated mixing matrix $\hat{A}$ in each of the bands of the Wavelet domain for the source signal estimate matrix $\hat{S}$, $W(\hat{S})$, and determining whether a convergence criteria, min $\lambda c^T|W(\hat{S})|$ is met for the source signal estimate matrix $\hat{S}$, where the convergence criteria, min $\lambda c^T|W(\hat{S})|$, is developed from the log likelihood function $L(W(\hat{S})|W(X),A)$ with the assumption of Laplanicity of source signals in the Wavelet domain following the probability $$P(W(S)) = \frac{\lambda}{2} e^{-\lambda c^T|W(\hat{S})|},$$

where $c^T=[1, 1, \ldots 1]$ is a unit vector, and if the convergence criteria is not met, min $\lambda c^T|W(\hat{S})|$, iteratively adjusting the clustering of the mixed signal samples to create a new set of clusters until the convergence criteria, min $\lambda c^T|W(\hat{S})|$, is met, to provide a final source signal estimate matrix $\hat{S}$.

5. An apparatus for blind separation of an overcomplete set of mixed signals as set forth in claim 4, wherein the apparatus is configured for separating mixed acoustic signals.

6. An apparatus for blind separation of an overcomplete set of mixed signals as set forth in claim 4, wherein the apparatus is configured for separating mixed radio frequency signals.

7. An apparatus for blind separation of an overcomplete set of mixed signals, the apparatus comprising:

i. a data processing system including an input for receiving mixed signals from a plurality of sensors configured to receive mixed signal samples comprising a mixture of signals transmitted from signal sources through an environment and noise, a signal processor attached with the input for receiving the mixed signals from the sensors, and a memory for storing data during operations of the signal processor; the data processing system further comprising:

ii. means for storing data representing the input from the sensors in a mixed signal matrix X;

iii. means for storing data representing the noise in a noise matrix V;

iv. means for storing data representing an estimate of the individual signals from the mixture of signals from the signal sources in a source signal estimate matrix $\hat{S}$;

v. means for storing data representing an estimate of the effects of the environment in a estimated mixing matrix $\hat{A}$ where the matrices are related by $X=\hat{A}\hat{S}+V$;

vi. means for generating an initial estimate of the estimated mixing matrix $\hat{A}$;

vii. means for determining the number of signal sources and associated lines of correlation of each of the signal sources from the estimated mixing matrix $\hat{A}$, and for representing the signal sources in the source signal estimate matrix $\hat{S}$;

viii. means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$; and ix. means for restoring the separated source signals from the optimized source signal estimate matrix $\hat{S}$, whereby a plurality of mixed signals from unknown sources traveling through an environment with added noise may be separated so that the original, separate signals may be reconstructed;

wherein the means for generating an initial estimate of the estimated mixing matrix Â comprises:
  i. means for transforming the mixed signal matrix X into the sparse domain using a transform operator;
  ii. means for determining a frequency band within the sparse domain that contains the most information that can be used to determine lines of correlation to determine the number of signal sources;
  iii. means for determining a measure and an optimal threshold for the measure for the determination of noise within the frequency band;
  iv. means for recalculating the measure used in the determination of the noise within the frequency band using the optimal threshold; and
  v. means for determining the local maxima of a distribution of the measure, where the local maxima represent angles which are inserted into the estimated mixing matrix Â to provide an initial estimate of the estimated mixing matrix Â;

wherein the means for jointly optimizing the source signal estimate matrix Ŝ and the estimated mixing matrix Â in an iterative manner, to generate an optimized source signal estimate matrix Ŝ and a final estimated mixing matrix Â further comprises:
  i. means for obtaining a multi-band sparse domain estimate of the source signal estimate matrix Ŝ using the relationship X=ÂŜ+V; and
  ii. means for using the adjusted geometric constraint corresponding to the final estimated mixing matrix Â in each of the bands of the sparse domain for the source signal estimate matrix Ŝ and determining whether a convergence criteria is met for the source signal estimate matrix Ŝ, and if the convergence criteria are not met, iteratively adjusting the clustering of the mixed signal samples to create a new set of clusters until the convergence criteria are met, to provide a final source signal estimate matrix Ŝ.

8. An apparatus for blind separation of an overcomplete set of mixed signals as set forth in claim 7, wherein the means for generating an initial estimate of the estimated mixing matrix Â comprises:
  i. means for transforming the mixed signal matrix X into the frequency domain using a Fourier operator;
  ii. means for using a mutual information criterion to determine a frequency band within the sparse domain that contains the most information that can be used to determine lines of correlation to determine the number of signal sources;
  iii. means for determining a random variable $$ang = \arctan\frac{x_i(\text{band})}{x_j(\text{band})},$$

where $x_i(\text{band})$ and $x_j(\text{band})$ represent Fourier values of mixture in the selected frequency band, and an optimal threshold ANG for ang, where the optimal threshold ANG is determined by computing the entropy E(ang, ANG) vs. ANG and searching for the optimal value of ANG corresponding to the minimum rate of descent of the entropy E(ang, ANG);
  iv. means for recalculating ang based on the optimal threshold ANG;
  v. means for using a standard peak detection technique to determine the number and values of local maxima of a histogram of ang where the local maxima represent angles which are inserted into the estimated mixing matrix Â to provide an initial estimate of the estimated mixing matrix Â.

9. An apparatus for blind separation of an overcomplete set of mixed signals as set forth in claim 8, wherein the means for jointly optimizing the source signal estimate matrix Ŝ and the estimated mixing matrix Â in an iterative manner, to generate an optimized source signal estimate matrix Ŝ and a final estimated mixing matrix Â comprises:
  i. means for clustering the mixed signal samples in the Fourier domain along the lines of correlation with one cluster per source using a straight distance metric geometric constraint, with the clusters representing estimates of the Fourier domain representation of Ŝ, F(Ŝ), where F represents a Fourier domain operator; and
  ii. means for evaluating a convergence criteria, min $\lambda c^T|F(\hat{S})|$, with the convergence criteria, min $\lambda c^T|F(\hat{S})|$, developed from the log likelihood function L(F(Ŝ)|F(X),A) with the assumption of Laplanicity of source signals in the Fourier domain following the probability $$P(F(S)) = \frac{\lambda}{2}e^{-\lambda c^T|F(\hat{S})|},$$

where $c^T=[1, 1, \ldots 1]$ is a unit vector, with the convergence criteria, min $\lambda c^T|F(\hat{S})|$, evaluated based on the clustered mixed signal samples to determine whether the convergence criteria, min $\lambda c^T|F(\hat{S})|$, is met, and if the convergence criteria, min $\lambda c^T|F(\hat{S})|$, is not met, iteratively adjusting the clustering of the mixed signal samples and parameters of the geometric constraint to create a new set of clusters until the convergence criteria, min $\lambda c^T|F(\hat{S})|$, is met, to provide a final estimated mixing matrix Â.

10. An apparatus for blind separation of an overcomplete set of mixed signals as set forth in claim 9, wherein the means for jointly optimizing the source signal estimate matrix Ŝ and the estimated mixing matrix Â in an iterative manner, to generate an optimized source signal estimate matrix Ŝ and a final estimated mixing matrix Â further comprises:
  i. means for obtaining a multi-band sparse domain estimate of the source signal estimate matrix Ŝ using the relationship X=ÂŜ+V, applied in the Wavelet domain; and
  ii. means for using the adjusted geometric constraint corresponding to the final estimated mixing matrix Â in each of the bands of the Wavelet domain for the source signal estimate matrix Ŝ, W(Ŝ), and determining whether a convergence criteria, min $\lambda c^T|W(\hat{S})|$ is met for the source signal estimate matrix Ŝ, where the convergence criteria, min $\lambda c^T|W(\hat{S})|$, is developed from the log likelihood function L(W(Ŝ)|W(X),A) with the assumption of Laplanicity of source signals in the Wavelet domain following the probability $$P(W(S)) = \frac{\lambda}{2}e^{-\lambda c^T|W(\hat{S})|},$$

where $c^T=[1, 1, \ldots 1]$ is a unit vector, and if the convergence criteria is not met, min $\lambda c^T|W(\hat{S})|$, iteratively adjusting the clustering of the mixed signal samples to create a new set of clusters until the convergence criteria, min $\lambda c^T|W(\hat{S})|$, is met, to provide a final source signal estimate matrix $\hat{S}$.

11. An apparatus for blind separation of an overcomplete set of mixed signals as set forth in claim 10, wherein the apparatus is configured for separating mixed acoustic signals.

12. An apparatus for blind separation of an overcomplete set of mixed signals as set forth in claim 10, wherein the apparatus is configured for separating mixed radio frequency signals.

13. A method for blind separation of an overcomplete set of mixed signals, using a data processing system including an input for receiving mixed signals from a plurality of sensors configured to receive mixed signal samples comprising a mixture of signals transmitted from signal sources through an environment and noise, a signal processor attached with the input for receiving the mixed signals from the sensors, and a memory for storing data during operations of the signal processor the method comprising the steps of:
  i. storing data representing the input from the sensors in a mixed signal matrix X;
  ii. storing data representing the noise in a noise matrix V;
  iii. storing data representing an estimate of the individual signals from the mixture of signals from the signal sources in a source signal estimate matrix $\hat{S}$;
  iv. storing data representing an estimate of the effects of the environment in a estimated mixing matrix $\hat{A}$ where the matrices are related by $X = \hat{A}\hat{S} + V$;
  v. generating an initial estimate of the estimated mixing matrix $\hat{A}$;
  vi. determining the number of signal sources and associated lines of correlation of each of the signal sources from the estimated mixing matrix $\hat{A}$, and for representing the signal sources in the source signal estimate matrix $\hat{S}$;
  vii. jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$; and
  viii. restoring the separated source signals from the optimized source signal estimate matrix $\hat{S}$, whereby a plurality of mixed signals from unknown sources traveling through an environment with added noise may be separated so that the original, separate signals may be reconstructed;

wherein the step of generating an initial estimate of the estimated mixing matrix $\hat{A}$ comprises the sub-steps of:
  i. transforming the mixed signal matrix X into the sparse domain using a transform operator;
  ii. determining a frequency band within the sparse domain that contains the most information that can be used to determine lines of correlation to determine the number of signal sources;
  iii. determining a measure and an optimal threshold for the measure for the determination of noise within the frequency band;
  iv. recalculating the measure used in the determination of the noise within the frequency band using the optimal threshold; and
  v. determining the local maxima of a distribution of the measure, where the local maxima represent angles which are inserted into the estimated mixing matrix $\hat{A}$ to provide an initial estimate of the estimated mixing matrix $\hat{A}$, and wherein the step of jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ comprises the sub-steps of:
  i. clustering the mixed signal samples using a geometric constraint; and
  ii. evaluating a convergence criteria based on the clustered mixed signal samples to determine whether the convergence criteria are met, and if the convergence criteria are not met, iteratively adjusting the clustering of the mixed signal samples and parameters of the geometric constraint to create a new set of clusters until the convergence criteria are met, to provide a final estimated mixing matrix $\hat{A}$.

14. A method for blind separation of an overcomplete set of mixed signals as set forth in claim 13, wherein the step of generating an initial estimate of the estimated mixing matrix $\hat{A}$ comprises the sub steps of:
  i. transforming the mixed signal matrix X into the frequency domain using a Fourier operator;
  ii. using a mutual information criterion to determine a frequency band within the sparse domain that contains the most information that can be used to determine lines of correlation to determine the number of signal sources;
  iii. determining a random variable $$ang = \arctan \frac{x_i(\text{band})}{x_j(\text{band})},$$

where $x_i(\text{band})$ and $x_j(\text{band})$ represent Fourier values of mixture in the selected frequency band, and an optimal threshold ANG for ang, where the optimal threshold ANG is determined by computing the entropy E(ang, ANG) vs. ANG and searching for the optimal value of ANG corresponding to the minimum rate of descent of the entropy E(ang, ANG);
  iv. recalculating ang based on the optimal threshold ANG;
  v. using a standard peak detection technique to determine the number and values of local maxima of a histogram of ang where the local maxima represent angles which are inserted into the estimated mixing matrix $\hat{A}$ to provide an initial estimate of the estimated mixing matrix $\hat{A}$.

15. A method for blind separation of an overcomplete set of mixed signals as set forth in claim 14, wherein the step of jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ comprises the sub steps of:
  i. clustering the mixed signal samples in the Fourier domain along the lines of correlation with one cluster per source using a straight distance metric geometric constraint, with the clusters representing estimates of the Fourier domain representation of $\hat{S}$, $F(\hat{S})$, where F represents a Fourier domain operator; and
  ii. evaluating a convergence criteria, min $\lambda c^T|F(\hat{S})|$, with the convergence criteria, min $\lambda c^T|F(\hat{S})|$, developed from the log likelihood function $L(F(\hat{S})|F(X),A)$ with the assumption of Laplanicity of source signals in the Fourier domain following the probability $$P(F(S)) = \frac{\lambda}{2} e^{-\lambda c^T |F(\hat{S})|},$$

where $c^T=[1, 1, \ldots 1]$ is a unit vector, with the convergence criteria, min $\lambda c^T|F(\hat{S})|$, evaluated based on the clustered mixed signal samples to determine whether the convergence criteria, min $\lambda c^T|F(\hat{S})|$, is met, and if the convergence criteria, min $\lambda c^T|F(\hat{S})|$, is not met, iteratively adjusting the clustering of the mixed signal samples and parameters of the geometric constraint to create a new set of clusters until the convergence criteria, min $\lambda c^T|F(\hat{S})|$, is met, to provide a final estimated mixing matrix $\hat{A}$.

16. A method for blind separation of an overcomplete set of mixed signals as set forth in claim 15, wherein the wherein the step of jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ further comprises the sub steps of:
   i. obtaining a multi-band sparse domain estimate of the source signal estimate matrix $\hat{S}$ using the relationship $X=\hat{A}\hat{S}+V$, applied in the Wavelet domain; and
   ii. using the adjusted geometric constraint corresponding to the final estimated mixing matrix $\hat{A}$ in each of the bands of the Wavelet domain for the source signal estimate matrix $\hat{S}$, $W(\hat{S})$, and determining whether a convergence criteria, min $\lambda c^T|W(\hat{S})|$, is met for the source signal estimate matrix $\hat{S}$, where the convergence criteria, min $\lambda c^T|W(\hat{S})|$, is developed from the log likelihood function $L(W(\hat{S})|W(X),A)$ with the assumption of Laplanicity of source signals in the Wavelet domain following the probability $$P(W(S)) = \frac{\lambda}{2} e^{-\lambda c^T |W(\hat{S})|},$$

where $c^T=[1, 1, \ldots 1]$ is a unit vector, and if the convergence criteria is not met, mm $\lambda c^T|W(\hat{S})|$, iteratively adjusting the clustering of the mixed signal samples to create a new set of clusters until the convergence criteria, min $\lambda c^T|W(\hat{S})|$, is met, to provide a final source signal estimate matrix $\hat{S}$.

17. A method for blind separation of an overcomplete set of mixed signals as set forth in claim 16, wherein the method is configured to separate mixed acoustic signals.

18. A method for blind separation of an overcomplete set of mixed signals as set forth in claim 16, wherein the method is configured to separate mixed radio frequency signals.

19. A method for blind separation of an overcomplete set of mixed signals, using a data processing system including an input for receiving mixed signals from a plurality of sensors configured to receive mixed signal samples comprising a mixture of signals transmitted from signal sources through an environment and noise, a signal processor attached with the input for receiving the mixed signals from the sensors, and a memory for storing data during operations of the signal processor the method comprising the steps of:
   i. storing data representing the input from the sensors in a mixed signal matrix X;
   ii. storing data representing the noise in a noise matrix V;
   iii. storing data representing an estimate of the individual signals from the mixture of signals from the signal sources in a source signal estimate matrix $\hat{S}$;
   iv. storing data representing an estimate of the effects of the environment in a estimated mixing matrix $\hat{A}$ where the matrices are related by $X=\hat{A}\hat{S}+V$;
   v. generating an initial estimate of the estimated mixing matrix $\hat{A}$;
   vi. determining the number of signal sources and associated lines of correlation of each of the signal sources from the estimated mixing matrix $\hat{A}$, and for representing the signal sources in the source signal estimate matrix $\hat{S}$;
   vii. jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$; and
   viii. restoring the separated source signals from the optimized source signal estimate matrix $\hat{S}$, whereby a plurality of mixed signals from unknown sources traveling through an environment with added noise may be separated so that the original, separate signals may be reconstructed;
wherein the step of generating an initial estimate of the estimated mixing matrix $\hat{A}$ comprises the sub-steps of:
   i. transforming the mixed signal matrix X into the sparse domain using a transform operator;
   ii. determining a frequency band within the sparse domain that contains the most information that can be used to determine lines of correlation to determine the number of signal sources;
   iii. determining a measure and an optimal threshold for the measure for the determination of noise within the frequency band;
   iv. recalculating the measure used in the determination of the noise within the frequency band using the optimal threshold; and
   v. determining the local maxima of a distribution of the measure, where the local maxima represent angles which are inserted into the estimated mixing matrix $\hat{A}$ to provide an initial estimate of the estimated mixing matrix $\hat{A}$, and
wherein the wherein the step of jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ further comprises the sub steps of:
   i. obtaining a multi-band sparse domain estimate of the source signal estimate matrix $\hat{S}$ using the relationship $X=\hat{A}\hat{S}+V$; and
   ii. using the adjusted geometric constraint corresponding to the final estimated mixing matrix $\hat{A}$ in each of the bands of the sparse domain for the source signal estimate matrix $\hat{S}$ and determining whether a convergence criteria is met for the source signal estimate matrix $\hat{S}$, and if the convergence criteria are not met, iteratively adjusting the clustering of the mixed signal samples to create a new set of clusters until the convergence criteria are met, to provide a final source signal estimate matrix $\hat{S}$.

20. A method for blind separation of an overcomplete set of mixed signals as set forth in claim 19, wherein the step of generating an initial estimate of the estimated mixing matrix $\hat{A}$ comprises the sub steps of:

i. transforming the mixed signal matrix X into the frequency domain using a Fourier operator;
ii. using a mutual information criterion to determine a frequency band within the sparse domain that contains the most information that can be used to determine lines of correlation to determine the number of signal sources;
iii. determining a random variable $$ang = \arctan\frac{x_i(\text{band})}{x_j(\text{band})},$$

where $x_i(\text{band})$ and $x_j(\text{band})$ represent Fourier values of mixture in the selected frequency band, and an optimal threshold ANG for ang, where the optimal threshold ANG is determined by computing the entropy E(ang, ANG) vs. ANG and searching for the optimal value of ANG corresponding to the minimum rate of descent of the entropy E(ang, ANG);
iv. recalculating ang based on the optimal threshold ANG;
v. using a standard peak detection technique to determine the number and values of local maxima of a histogram of ang where the local maxima represent angles which are inserted into the estimated mixing matrix $\hat{A}$ to provide an initial estimate of the estimated mixing matrix $\hat{A}$.

21. A method for blind separation of an overcomplete set of mixed signals as set forth in claim 20, wherein the step of jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ comprises the sub steps of:
   i. clustering the mixed signal samples in the Fourier domain along the lines of correlation with one cluster per source using a straight distance metric geometric constraint, with the clusters representing estimates of the Fourier domain representation of $\hat{S}$, $F(\hat{S})$, where F represents a Fourier domain operator; and
   ii. evaluating a convergence criteria, min $\lambda c^T|F(\hat{S})|$, with the convergence criteria, min $\lambda c^T|F(\hat{S})|$, developed from the log likelihood function $L(F(\hat{S})|F(X),A)$ with the assumption of Laplanicity of source signals in the Fourier domain following the probability $$P(F(S)) = \frac{\lambda}{2}e^{-\lambda c^T|F(\hat{S})|},$$

where $c^T = [1, 1, \ldots 1]$ is a unit vector, with the convergence criteria, min $\lambda c^T|F(\hat{S})|$, evaluated based on the clustered mixed signal samples to determine whether the convergence criteria, min $\lambda c^T|F(\hat{S})|$, is met, and if the convergence criteria, min $\lambda c^T|F(\hat{S})|$, is not met, iteratively adjusting the clustering of the mixed signal samples and parameters of the geometric constraint to create a new set of clusters until the convergence criteria, min $\lambda c^T|F(\hat{S})|$, is met, to provide a final estimated mixing matrix $\hat{A}$.

22. A method for blind separation of an overcomplete set of mixed signals as set forth in claim 21, wherein the wherein the step of jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ further comprises the sub steps of:
   i. obtaining a multi-band sparse domain estimate of the source signal estimate matrix $\hat{S}$ using the relationship $X = \hat{A}\hat{S} + V$, applied in the Wavelet domain; and
   ii. using the adjusted geometric constraint corresponding to the final estimated mixing matrix $\hat{A}$ in each of the bands of the Wavelet domain for the source signal estimate matrix $\hat{S}$, $W(\hat{S})$, and determining whether a convergence criteria, min $\lambda c^T|W(\hat{S})|$ is met for the source signal estimate matrix $\hat{S}$, where the convergence criteria, min $\lambda c^T|W(\hat{S})|$, is developed from the log likelihood function $L(W(\hat{S})|W(X),A)$ with the assumption of Laplanicity of source signals in the Wavelet domain following the probability $$P(W(S)) = \frac{\lambda}{2}e^{-\lambda c^T|W(\hat{S})|},$$

where $c^T = [1, 1, \ldots 1]$ is a unit vector, and if the convergence criteria is not met, min $\lambda c^T|W(\hat{S})|$, iteratively adjusting the clustering of the mixed signal samples to create a new set of clusters until the convergence criteria, min $\lambda c^T|W(\hat{S})|$, is met, to provide a final source signal estimate matrix $\hat{S}$.

23. A method for blind separation of an overcomplete set of mixed signals as set forth in claim 22, wherein the method is configured to separate mixed acoustic signals.

24. A method for blind separation of an overcomplete set of mixed signals as set forth in claim 22, wherein the method is configured to separate mixed radio frequency signals.

25. A computer program product for blind separation of an overcomplete set of mixed signals, readable on a data processing system including an input for receiving mixed signals from a plurality of sensors configured to receive mixed signal samples comprising a mixture of signals transmitted from signal sources through an environment and noise, a signal processor attached with the input for receiving the mixed signals from the sensors, and a memory for storing data during operations of the signal processor the computer program product comprising means, stored on a computer readable medium, for:
   i. storing data representing the input from the sensors in a mixed signal matrix X;
   ii. storing data representing the noise in a noise matrix V;
   iii. storing data representing an estimate of the individual signals from the mixture of signals from the signal sources in a source signal estimate matrix $\hat{S}$;
   iv. storing data representing an estimate of the effects of the environment in a estimated mixing matrix $\hat{A}$ where the matrices are related by $X = \hat{A}\hat{S} + V$;
   v. generating an initial estimate of the estimated mixing matrix $\hat{A}$;
   vi. determining the number of signal sources and associated lines of correlation of each of the signal sources from the estimated mixing matrix $\hat{A}$, and for representing the signal sources in the source signal estimate matrix $\hat{S}$;
   vii. jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$; and
   viii. restoring the separated source signals from the optimized source signal estimate matrix $\hat{S}$, whereby a plurality of mixed signals from unknown sources traveling through an environment with added noise may be separated so that the original, separate signals may be reconstructed, wherein the means for generating an initial estimate of the estimated mixing matrix Â comprises:
i. means for transforming the mixed signal matrix X into the sparse domain using a transform operator;
ii. means for determining a frequency band within the sparse domain that contains the most information that can be used to determine lines of correlation to determine the number of signal sources;
iii. means for determining a measure and an optimal threshold for the measure for the determination of noise within the frequency band;
iv. means for recalculating the measure used in the determination of the noise within the frequency band using the optimal threshold; and
v. means for determining the local maxima of a distribution of the measure, where the local maxima represent angles which are inserted into the estimated mixing matrix Â to provide an initial estimate of the estimated mixing matrix Â, and wherein the means for jointly optimizing the source signal estimate matrix Ŝ and the estimated mixing matrix Â in an iterative manner, to generate an optimized source signal estimate matrix Ŝ and a final estimated mixing matrix Â comprises:
i. means for clustering the mixed signal samples using a geometric constraint; and
ii. means for evaluating a convergence criteria based on the clustered mixed signal samples to determine whether the convergence criteria are met, and if the convergence criteria are not met, iteratively adjusting the clustering of the mixed signal samples and parameters of the geometric constraint to create a new set of clusters until the convergence criteria are met, to provide a final estimated mixing matrix Â.

26. A computer program product for blind separation of an overcomplete set of mixed signals as set forth in claim 25, wherein the means for generating an initial estimate of the estimated mixing matrix Â comprises:
i. means for transforming the mixed signal matrix X into the frequency domain using a Fourier operator;
ii. means for using a mutual information criterion to determine a frequency band within the sparse domain that contains the most information that can be used to determine lines of correlation to determine the number of signal sources;
iii. means for determining a random variable $$ang = \arctan \frac{x_i(\text{band})}{x_j(\text{band})},$$

where $x_i(\text{band})$ and $x^j(\text{band})$ represent Fourier values of mixture in the selected frequency band, and an optimal threshold ANG for ang, where the optimal threshold ANG is determined by computing the entropy E(ang, ANG) vs. ANG and searching for the optimal value of ANG corresponding to the minimum rate of descent of the entropy E(ang, ANG);
iv. means for recalculating ang based on the optimal threshold ANG;
v. means for using a standard peak detection technique to determine the number and values of local maxima of a histogram of ang where the local maxima represent angles which are inserted into the estimated mixing matrix Â to provide an initial estimate of the estimated mixing matrix Â.

27. A computer program product for blind separation of an overcomplete set of mixed signals as set forth in claim 26, wherein the means for jointly optimizing the source signal estimate matrix Ŝ and the estimated mixing matrix Â in an iterative manner, to generate an optimized source signal estimate matrix Ŝ and a final estimated mixing matrix Â comprises:
i. means for clustering the mixed signal samples in the Fourier domain along the lines of correlation with one cluster per source using a straight distance metric geometric constraint, with the clusters representing estimates of the Fourier domain representation of Ŝ, F(Ŝ), where F represents a Fourier domain operator; and
ii. means for evaluating a convergence criteria, min $\lambda c^T |F(\hat{S})|$, with the convergence criteria, min $\lambda c^T |F(\hat{S})|$, developed from the log likelihood function L(F(Ŝ)|F(X),A) with the assumption of Laplanicity of source signals in the Fourier domain following the probability $$P(F(S)) = \frac{\lambda}{2} e^{-\lambda c^T |F(\hat{S})|},$$

where $c^T=[1, 1, \ldots 1]$ is a unit vector, with the convergence criteria, min $\lambda c^T |F(\hat{S})|$, evaluated based on the clustered mixed signal samples to determine whether the convergence criteria, min $\lambda c^T |F(\hat{S})|$, is met, and if the convergence criteria, min $\lambda c^T |F(\hat{S})|$, is not met, iteratively adjusting the clustering of the mixed signal samples and parameters of the geometric constraint to create a new set of clusters until the convergence criteria, min $\lambda c^T |F(\hat{S})|$, is met, to provide a final estimated mixing matrix Â.

28. A computer program product for blind separation of an overcomplete set of mixed signals as set forth in claim 27, wherein the wherein the means for jointly optimizing the source signal estimate matrix Ŝ and the estimated mixing matrix Â in an iterative manner, to generate an optimized source signal estimate matrix Ŝ and a final estimated mixing matrix Â further comprises:
i. means for obtaining a multi-band sparse domain estimate of the source signal estimate matrix Ŝ using the relationship X=ÂŜ+V, applied in the Wavelet domain; and
ii. means for using the adjusted geometric constraint corresponding to the final estimated mixing matrix Â in each of the bands of the Wavelet domain for the source signal estimate matrix Ŝ, W(Ŝ), and determining whether a convergence criteria, min $\lambda c^T |W(\hat{S})|$ is met for the source signal estimate matrix Ŝ, where the convergence criteria, min $\lambda c^T |W(\hat{S})|$, is developed from the log likelihood function L(W(Ŝ)|W(X),A) with the assumption of Laplanicity of source signals in the Wavelet domain following the probability $$P(W(S)) = \frac{\lambda}{2} e^{-\lambda c^T |W(\hat{S})|},$$

where $c^T=[1, 1, \ldots 1]$ is a unit vector, and if the convergence criteria is not met, min $\lambda c^T |W(\hat{S})|$, iteratively adjusting the clustering of the mixed signal samples to create a new set of clusters until the convergence criteria, min λc$^T$|W(Ŝ)|, is met, to provide a final source signal estimate matrix Ŝ.

29. A computer program product for blind separation of an overcomplete set of mixed signals as set forth in claim 27, wherein the computer program product is configured for separating mixed acoustic signals.

30. A computer program product for blind separation of an overcomplete set of mixed signals as set forth in claim 27, wherein the computer program product is configured for separating mixed radio frequency signals.

31. A computer program product for blind separation of an overcomplete set of mixed signals, readable on a data processing system including an input for receiving mixed signals from a plurality of sensors configured to receive mixed signal samples comprising a mixture of signals transmitted from signal sources through an environment and noise, a signal processor attached with the input for receiving the mixed signals from the sensors, and a memory for storing data during operations of the signal processor the computer program product comprising means, stored on a computer readable medium, for:
  i. storing data representing the input from the sensors in a mixed signal matrix X;
  ii. storing data representing the noise in a noise matrix V;
  iii. storing data representing an estimate of the individual signals from the mixture of signals from the signal sources in a source signal estimate matrix Ŝ;
  iv. storing data representing an estimate of the effects of the environment in a estimated mixing matrix Â where the matrices are related by X=ÂŜ+V;
  v. generating an initial estimate of the estimated mixing matrix Â;
  vi. determining the number of signal sources and associated lines of correlation of each of the signal sources from the estimated mixing matrix Â, and for representing the signal sources in the source signal estimate matrix Ŝ;
  vii. jointly optimizing the source signal estimate matrix Ŝ and the estimated mixing matrix Â in an iterative manner, to generate an optimized source signal estimate matrix Ŝ and a final estimated mixing matrix Â; and
  viii. restoring the separated source signals from the optimized source signal estimate matrix Ŝ, whereby a plurality of mixed signals from unknown sources traveling through an environment with added noise may be separated so that the original, separate signals may be reconstructed,
  wherein the means for generating an initial estimate of the estimated mixing matrix Â comprises:
    i. means for transforming the mixed signal matrix X into the sparse domain using a transform operator;
    ii. means for determining a frequency band within the sparse domain that contains the most information that can be used to determine lines of correlation to determine the number of signal sources;
    iii. means for determining a measure and an optimal threshold for the measure for the determination of noise within the frequency band;
    iv. means for recalculating the measure used in the determination of the noise within the frequency band using the optimal threshold; and
    v. means for determining the local maxima of a distribution of the measure, where the local maxima represent angles which are inserted into the estimated mixing matrix Â to provide an initial estimate of the estimated mixing matrix Â, and
  wherein the wherein the means for jointly optimizing the source signal estimate matrix Ŝ and the estimated mixing matrix Â in an iterative manner, to generate an optimized source signal estimate matrix Ŝ and a final estimated mixing matrix Â further comprises:
    i. means for obtaining a multi-band sparse domain estimate of the source signal estimate matrix Ŝ using the relationship X=ÂŜ+V; and
    ii. means for using the adjusted geometric constraint corresponding to the final estimated mixing matrix Â in each of the bands of the sparse domain for the source signal estimate matrix Ŝ and determining whether a convergence criteria is met for the source signal estimate matrix Ŝ, and if the convergence criteria are not met, iteratively adjusting the clustering of the mixed signal samples to create a new set of clusters until the convergence criteria are met, to provide a final source signal estimate matrix Ŝ.

32. A computer program product for blind separation of an overcomplete set of mixed signals as set forth in claim 31, wherein the means for generating an initial estimate of the estimated mixing matrix Â comprises:
  i. means for transforming the mixed signal matrix X into the frequency domain using a Fourier operator;
  ii. means for using a mutual information criterion to determine a frequency band within the sparse domain that contains the most information that can be used to determine lines of correlation to determine the number of signal sources;
  iii. means for determining a random variable $$ang = \arctan\frac{x_i(\text{band})}{x_j(\text{band})},$$

where $x_i$(band) and $x_j$(band) represent Fourier values of mixture in the selected frequency band, and an optimal threshold ANG for ang, where the optimal threshold ANG is determined by computing the entropy E(ang, ANG) vs. ANG and searching for the optimal value of ANG corresponding to the minimum rate of descent of the entropy E(ang, ANG);
  iv. means for recalculating ang based on the optimal threshold ANG;
  v. means for using a standard peak detection technique to determine the number and values of local maxima of a histogram of ang where the local maxima represent angles which are inserted into the estimated mixing matrix Â to provide an initial estimate of the estimated mixing matrix Â.

33. A computer program product for blind separation of an overcomplete set of mixed signals as set forth in claim 32, wherein the means for jointly optimizing the source signal estimate matrix Ŝ and the estimated mixing matrix Â in an iterative manner, to generate an optimized source signal estimate matrix Ŝ and a final estimated mixing matrix Â comprises:
  i. means for clustering the mixed signal samples in the Fourier domain along the lines of correlation with one cluster per source using a straight distance metric geometric constraint, with the clusters representing estimates of the Fourier domain representation of Ŝ, F(Ŝ), where F represents a Fourier domain operator; and ii. means for evaluating a convergence criteria, min $\lambda c^T|F(\hat{S})|$, with the convergence criteria, min $\lambda c^T|F(\hat{S})|$, developed from the log likelihood function $L(F(\hat{S})|F(X),A)$ with the assumption of Laplanicity of source signals in the Fourier domain following the probability $$P(F(S)) = \frac{\lambda}{2}e^{-\lambda c^T|F(\hat{S})|},$$

where $c^T=[1, 1, \ldots 1]$ is a unit vector, with the convergence criteria, min $\lambda c^T|F(\hat{S})|$, evaluated based on the clustered mixed signal samples to determine whether the convergence criteria, min $\lambda c^T|F(\hat{S})|$, is met, and if the convergence criteria, min $\lambda c^T|F(\hat{S})|$, is not met, iteratively adjusting the clustering of the mixed signal samples and parameters of the geometric constraint to create a new set of clusters until the convergence criteria, min $\lambda c^T|F(\hat{S})|$, is met, to provide a final estimated mixing matrix $\hat{A}$.

34. A computer program product for blind separation of an overcomplete set of mixed signals as set forth in claim 33, wherein the wherein the means for jointly optimizing the source signal estimate matrix $\hat{S}$ and the estimated mixing matrix $\hat{A}$ in an iterative manner, to generate an optimized source signal estimate matrix $\hat{S}$ and a final estimated mixing matrix $\hat{A}$ further comprises:
   i. means for obtaining a multi-band sparse domain estimate of the source signal estimate matrix $\hat{S}$ using the relationship $X=\hat{A}\hat{S}+V$, applied in the Wavelet domain; and
   ii. means for using the adjusted geometric constraint corresponding to the final estimated mixing matrix $\hat{A}$ in each of the bands of the Wavelet domain for the source signal estimate matrix $\hat{S}$, $W(\hat{S})$, and determining whether a convergence criteria, min $\lambda c^T|W(\hat{S})|$ is met for the source signal estimate matrix $\hat{S}$, where the convergence criteria, min $\lambda c^T|W(\hat{S})|$, is developed from the log likelihood function $L(W(\hat{S})|W(X),A)$ with the assumption of Laplanicity of source signals in the Wavelet domain following the probability $$P(W(S)) = \frac{\lambda}{2}e^{-\lambda c^T|W(\hat{S})|},$$

where $c^T=[1, 1, \ldots 1]$ is a unit vector, and if the convergence criteria is not met, min $\lambda c^T|W(\hat{S})|$, iteratively adjusting the clustering of the mixed signal samples to create a new set of clusters until the convergence criteria, min $\lambda c^T|W(\hat{S})|$, is met, to provide a final source signal estimate matrix $\hat{S}$.

35. A computer program product for blind separation of an overcomplete set of mixed signals as set forth in claim 33, wherein the computer program product is configured for separating mixed acoustic signals.

36. A computer program product for blind separation of an overcomplete set of mixed signals as set forth in claim 33, wherein the computer program product is configured for separating mixed radio frequency signals.

37. An apparatus for determining a CR bound for an estimated mixing matrix $\hat{A}$ developed in the blind separation of an overcomplete set of mixed signals, the apparatus comprising a data processing system including a processor, a memory coupled with the processor, an input coupled with the processor, an output coupled with the processor, means within the data processing system for generating a CR bound for the estimated mixing matrix $\hat{A}$, and means for generating an output of the expected value for the estimation error of associated lines of correlation and for providing the output to a user via the output, whereby a CR bound may be developed for determining the performance of an estimate of a mixing matrix $\hat{A}$ developed in the blind separation of an overcomplete set of mixed signals in order that a user may know the performance limitations of a blind separation apparatus, wherein the means for determining the expected value for the estimation error is in the form of $E\{(\theta_i-\hat{\theta}_i)^2\}$ where $$E\{(\theta_i - \hat{\theta}_i)^2\} \geq \frac{\lambda_k^2}{2Nu^T(\theta_i)p^T R_{W(V)}^{-1} pu(\theta_i)}, \text{ where:}$$

$E\{(\theta_i-\hat{\theta}_i)^2\}$ is an expected value for the estimation error of associated lines of correlation;

$$\theta_i = \arctan\left(\frac{a_i}{\|a_i\|}\right), \text{ where } a_i = \begin{bmatrix} a_{1i} \\ a_{2i} \end{bmatrix}, i = 1, 2, \ldots M, \text{ and}$$

$$\hat{A} = \hat{A}(\theta) = u(\theta_i);$$

$\hat{\theta}_i$ is an estimated value corresponding to an actual value of $\theta_i$;

$\lambda_k^2$ is developed from the log likelihood function $L(W(\hat{S})|W(X),A(\theta))$ used for the estimation of the mixing matrix $\hat{A}$ and the estimation of a source signal estimate matrix $\hat{S}$;

N is a number of data samples used in the generation of the mixing matrix $\hat{A}$ and the source signal estimate matrix $\hat{S}$;

$$u(\theta_i) = \begin{bmatrix} \cos(\theta_i) \\ \sin(\theta_i) \end{bmatrix};$$

$$p = \begin{bmatrix} 0 & -1 \\ 1 & 0 \end{bmatrix};$$

T is the transpose operator; and $$R_{W(V)}^{-1} = \begin{bmatrix} \sigma_{W(V)}^2 & \rho\sigma_{W(V)}^2 \\ \rho\sigma_{W(V)}^2 & \sigma_{W(V)}^2 \end{bmatrix},$$

where $\sigma_{w(v)}^2$ is a cross correlation of a noise set and $\rho$ is a constant multiplier value.

38. An apparatus for determining a CR bound for an source signal estimate matrix $\hat{S}$ developed in the blind separation of an overcomplete set of mixed signals, the apparatus comprising a data processing system including a processor, a memory coupled with the processor, an input coupled with the processor, an output coupled with the processor, means within the data processing system for generating a CR bound for the source signal estimate matrix $\hat{S}$, and means for generating an output of the expected value for the estimation error of associated lines of correlation and for providing the output to a user via the output, whereby a CR bound may be developed for determining the performance of an estimate of a source signal estimate matrix $\hat{S}$ developed in the blind separation of an overcomplete set of mixed signals in order that a user may know the performance limitations of a blind separation apparatus, wherein the means for determining the expected value for the estimation error is in the form of $E\{(W(S)-W(\hat{S}))^2\}$ where $E\{(W(S)-W(\hat{S}))^2\} \geq \left(\sigma_v^2 \begin{bmatrix} 1 & \rho \\ \rho & 1 \end{bmatrix} \hat{A}^T(\theta)\hat{A}(\theta) + \lambda^2 I\right)^{-1}$, where $\sigma_v^2$ represents a noise level;

$\rho$ is a constant multiplier value;

$\hat{A}$ is an estimated mixing matrix;

$\theta_i = \arctan\left(\frac{a_i}{\|a_i\|}\right)$, where $a_i = \begin{bmatrix} a_{1i} \\ a_{2i} \end{bmatrix}$, $i = 1, 2, \ldots M$, and $\hat{A} = \hat{A}(\theta) = u(\theta_i)$;

$\lambda_k^2$ is developed from the log likelihood function $L(W(\hat{S})|W(X),A(\theta))$; and I is an identity matrix.

39. A method for determining a CR bound for an estimated mixing matrix $\hat{A}$ developed in the blind separation of an overcomplete set of mixed signals, operating on an apparatus comprising a data processing system including a processor, a memory coupled with the processor, an input coupled with the processor, an output coupled with the processor, the method comprising the steps of generating a CR bound for the estimated mixing matrix $\hat{A}$, and generating an output of the expected value for the estimation error of associated lines of correlation and for providing the output to a user via the output, whereby a CR bound may be developed for determining the performance of an estimate of a mixing matrix $\hat{A}$ developed in the blind separation of an overcomplete set of mixed signals in order that a user may know the performance limitations of a blind separation apparatus, wherein in the step of determining the expected value for the estimation error, the expected value for estimation error is in the form of $E\{(\theta_i - \hat{\theta}_i)^2\}$ where $E\{(\theta_i - \hat{\theta}_i)^2\} \geq \frac{\lambda_k^2}{2Nu^T(\theta_i)p^T R_{W(V)}^{-1} pu(\theta_i)}$, where:

$E\{(\theta_i - \hat{\theta}_i)^2\}$ is an expected value for the estimation error of associated lines of correlation;

$\theta_i = \arctan\left(\frac{a_i}{\|a_i\|}\right)$, where $a_i = \begin{bmatrix} a_{1i} \\ a_{2i} \end{bmatrix}$, $i = 1, 2, \ldots M$, and $\hat{A} = \hat{A}(\theta) = u(\theta_i)$;

$\hat{\theta}_i$ is an estimated value corresponding to an actual value of $\theta_i$;

$\lambda_k^2$ is developed from the log likelihood function $L(W(\hat{S})|W(X),A(\theta))$ used for the estimation of the mixing matrix $\hat{A}$ and the estimation of a source signal estimate matrix $\hat{S}$;

N is a number of data samples used in the generation of the mixing matrix $\hat{A}$ and the source signal estimate matrix $\hat{S}$;

$u(\theta_i) = \begin{bmatrix} \cos(\theta_i) \\ \sin(\theta_i) \end{bmatrix}$;

$p = \begin{bmatrix} 0 & -1 \\ 1 & 0 \end{bmatrix}$;

T is the transpose operator; and $R_{W(V)}^{-1} = \begin{bmatrix} \sigma_{W(V)}^2 & \rho\sigma_{W(V)}^2 \\ \rho\sigma_{W(V)}^2 & \sigma_{W(V)}^2 \end{bmatrix}$, where $\sigma_{W(V)}^2$ is a cross correlation of a noise set and $\rho$ is a constant multiplier value.

40. A method for determining a CR bound for an source signal estimate matrix $\hat{S}$ developed in the blind separation of an overcomplete set of mixed signals, operated in an apparatus comprising a data processing system including a processor, a memory coupled with the processor, an input coupled with the processor, an output coupled with the processor, the method comprising the steps of generating a CR bound for the source signal estimate matrix $\hat{S}$, and generating an output of the expected value for the estimation error of associated lines of correlation and for providing the output to a user via the output, whereby a CR bound may be developed for determining the performance of an estimate of a source signal estimate matrix $\hat{S}$ developed in the blind separation of an overcomplete set of mixed signals in order that a user may know the performance limitations of a blind separation apparatus, wherein the in the step of determining the expected value for the estimation error, the expected value for the estimation error is in the form of $E\{(W(S)-W(\hat{S}))^2\}$ where $E\{(W(S)-W(\hat{S}))^2\} \geq \left(\sigma_v^2 \begin{bmatrix} 1 & \rho \\ \rho & 1 \end{bmatrix} \hat{A}^T(\theta)\hat{A}(\theta) + \lambda^2 I\right)^{-1}$, where $\sigma_v^2$ represents a noise level;

$\rho$ is a constant multiplier value;

$\hat{A}$ is an estimated mixing matrix;

$\theta_i = \arctan\left(\frac{a_i}{\|a_i\|}\right)$, where $a_i = \begin{bmatrix} a_{1i} \\ a_{2i} \end{bmatrix}$, $i = 1, 2, \ldots M$, and $\hat{A} = \hat{A}(\theta) = u(\theta_i)$;

$\lambda_k^2$ is developed from the log likelihood function $L(W(\hat{S})|W(X),A(\theta))$; and I is an identity matrix.

41. A computer program product for determining a CR bound for an estimated mixing matrix $\hat{A}$ developed in the blind separation of an overcomplete set of mixed signals, the computer program product being written onto a medium readable on a data processing system including a processor, a memory coupled with the processor, an input coupled with the processor, an output coupled with the processor, with the computer program product comprising means for generating a CR bound for the estimated mixing matrix $\hat{A}$, and means for generating an output of the expected value for the estimation error of associated lines of correlation and for providing the output to a user via the output, whereby a CR bound may be developed for determining the performance of an estimate of a mixing matrix $\hat{A}$ developed in the blind separation of an overcomplete set of mixed signals in order that a user may know the performance limitations of a blind separation apparatus, wherein the means for determining the expected value for the estimation error determines an estimation error by calculating $E\{(\theta_i - \hat{\theta}_i)^2\}$ where $$E\{(\theta_i - \hat{\theta}_i)^2\} \geq \frac{\lambda_k^2}{2Nu^T(\theta_i)p^T R_{W(V)}^{-1} pu(\theta_i)},$$

where:

$E\{(\theta_i - \hat{\theta}_i)^2\}$ is an expected value for the estimation error of associated lines of correlation;

$$\theta_i = \arctan\left(\frac{a_i}{\|a_i\|}\right), \text{ where } a_i = \begin{bmatrix} a_{1i} \\ a_{2i} \end{bmatrix}, i = 1, 2, \ldots M, \text{ and}$$

$$\hat{A} = \hat{A}(\theta) = u(\theta_i);$$

$\hat{\theta}_i$ is an estimated value corresponding to an actual value of $\theta_i$;

$\lambda_k^2$ is developed from the log likelihood function $L(W(\hat{S})|W(X),A(\theta))$ used for the estimation of the mixing matrix $\hat{A}$ and the estimation of a source signal estimate matrix $\hat{S}$;

N is a number of data samples used in the generation of the mixing matrix $\hat{A}$ and the source signal estimate matrix $\hat{S}$;

$$u(\theta_i) = \begin{bmatrix} \cos(\theta_i) \\ \sin(\theta_i) \end{bmatrix};$$

$$p = \begin{bmatrix} 0 & -1 \\ 1 & 0 \end{bmatrix};$$

T is the transpose operator; and $$R_{W(V)}^{-1} = \begin{bmatrix} \sigma_{w(v)}^2 & \rho\sigma_{w(v)}^2 \\ \rho\sigma_{w(v)}^2 & \sigma_{w(v)}^2 \end{bmatrix},$$

where $\sigma_{W(V)}^2$ is a cross correlation of a noise set and $\rho$ is a constant multiplier value.

42. A computer program product for determining a CR bound for an source signal estimate matrix $\hat{S}$ developed in the blind separation of an overcomplete set of mixed signals, the computer program product being written onto a medium readable on a data processing system including a processor, a memory coupled with the processor, an input coupled with the processor, an output coupled with the processor, with the computer program product comprising means for generating a CR bound for the source signal estimate matrix $\hat{S}$, and means for generating an output of the expected value for the estimation error of associated lines of correlation and for providing the output to a user via the output, whereby a CR bound may be developed for determining the performance of an estimate of a source signal estimate matrix $\hat{S}$ developed in the blind separation of an overcomplete set of mixed signals in order that a user may know the performance limitations of a blind separation apparatus, wherein the means for determining the expected value for the estimation error determines an estimation error by calculating $E\{(W(S) - W(\hat{S}))^2\}$ where $$E\{(W(S) - W(\hat{S}))^2\} \geq \left(\sigma_v^2 \begin{bmatrix} 1 & \rho \\ \rho & 1 \end{bmatrix} \hat{A}^T(\theta)\hat{A}(\theta) + \lambda^2 I\right)^{-1},$$

where $\sigma_v^2$ represents a noise level;

$\rho$ is a constant multiplier value;

$\hat{A}$ is an estimated mixing matrix;

$$\theta_i = \arctan\left(\frac{a_i}{\|a_i\|}\right), \text{ where } a_i = \begin{bmatrix} a_{1i} \\ a_{2i} \end{bmatrix}, i = 1, 2, \ldots M, \text{ and}$$

$$\hat{A} = \hat{A}(\theta) = u(\theta_i);$$

$\lambda_k^2$ is developed from the log likelihood function $L(W(\hat{S})|W(X),A(\theta))$; and I is an identity matrix.

* * * * *